(12) United States Patent
Yanagihara et al.

(10) Patent No.: US 10,418,602 B2
(45) Date of Patent: Sep. 17, 2019

(54) BATTERY PACK

(71) Applicant: Nissan Motor Co., Ltd., Yokohama-shi, Kanagawa (JP)

(72) Inventors: Yasuhiro Yanagihara, Kanagawa (JP); Masayuki Nakai, Kanagawa (JP); Manato Itabashi, Kanagawa (JP); Yui Suzuki, Kanagawa (JP); Masahiro Nakamoto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/764,361

(22) PCT Filed: Oct. 22, 2015

(86) PCT No.: PCT/JP2015/079899
§ 371 (c)(1),
(2) Date: Mar. 29, 2018

(87) PCT Pub. No.: WO2017/068704
PCT Pub. Date: Apr. 27, 2017

(65) Prior Publication Data
US 2018/0287110 A1    Oct. 4, 2018

(51) Int. Cl.
*H01M 2/18* (2006.01)
*H01M 2/10* (2006.01)
(Continued)

(52) U.S. Cl.
CPC ........... *H01M 2/1016* (2013.01); *H01M 2/10* (2013.01); *H01M 2/1061* (2013.01);
(Continued)

(58) Field of Classification Search
CPC ................................. H01M 2/10; H01M 2/20
See application file for complete search history.

(56) References Cited

U.S. PATENT DOCUMENTS

| | | | |
|---|---|---|---|
| 9,356,278 B2 | 5/2016 | Suzuki | |
| 2008/0124617 A1* | 5/2008 | Bjork | H01M 2/204 429/90 |

(Continued)

FOREIGN PATENT DOCUMENTS

| | | |
|---|---|---|
| CN | 202308134 U | 7/2012 |
| CN | 104241673 A | 12/2014 |

(Continued)

*Primary Examiner* — James Lee
(74) *Attorney, Agent, or Firm* — Global IP Counselors, LLP

(57) ABSTRACT

A battery pack includes a cell group, a spacer, a plurality of bus bars, and a bus bar holder. The cell group includes stacked unit cells, each including a cell body having a power generation element and an electrode tab having distal end portions bent along the stacking direction. The spacer is disposed between adjacent electrode tabs. The bus bars electrically connect the electrode tabs to each other. The bus bar holder that holds the bus bars. The bus bar holder includes a restricting member disposed between adjacent electrode tabs, and extends along the stacking direction to restrict the electrode tabs by sandwiching the electrode tabs with the spacer. Portions of the electrode tabs are welded to a surface of the bus bars facing the unit cells when the stacking direction positions of the portions of the electrode tabs are restricted by the restricting member and the spacer.

9 Claims, 15 Drawing Sheets

(51) Int. Cl.
  *H01M 2/20*  (2006.01)
  *H01M 2/26*  (2006.01)
  *H01M 2/02*  (2006.01)
  *H01M 10/04*  (2006.01)

(52) U.S. Cl.
  CPC ......... *H01M 2/1077* (2013.01); *H01M 2/18* (2013.01); *H01M 2/20* (2013.01); *H01M 2/202* (2013.01); *H01M 2/266* (2013.01); *H01M 2/021* (2013.01); *H01M 10/0472* (2013.01)

(56) References Cited

U.S. PATENT DOCUMENTS

| | | | |
|---|---|---|---|
| 2010/0291421 A1* | 11/2010 | Byun | H01M 2/043 429/61 |
| 2014/0023909 A1 | 1/2014 | Suzuki | |
| 2014/0377634 A1 | 12/2014 | Nakajyo | |

FOREIGN PATENT DOCUMENTS

| | | |
|---|---|---|
| CN | 104769746 A | 7/2015 |
| JP | 2010-287568 A | 12/2010 |
| JP | 2012-515418 A | 7/2012 |
| JP | 2013-118115 A | 6/2013 |
| JP | 2013-229266 A | 11/2013 |
| JP | 2014-22195 A | 2/2014 |
| JP | 2014-110219 A | 6/2014 |
| JP | 2015-153486 A | 8/2015 |
| WO | 2007/121445 A2 | 10/2007 |
| WO | 2012/131801 A1 | 10/2012 |

* cited by examiner

BATTERY PACK

CROSS-REFERENCE TO RELATED APPLICATIONS

This application is a U.S. National stage application of International Application No. PCT/JP2015/079899, filed on Oct. 22, 2015.

BACKGROUND

Field of the Invention

The present invention relates to a battery pack in which a plurality of unit cells are stacked.

Background Information

Conventionally, there is a battery pack in which a plurality of unit cells is stacked (refer to Japanese Laid Open Patent Application No. 2012-515418, hereinafter Patent Document 1). The unit cells comprise electrode tabs to and from which electric power is input and output. The electrode tabs of the unit cells are electrically connected by using a bus bar having electrical conductivity.

In Patent Document 1, the electrode tab of the unit cell protrudes in a direction that is orthogonal to the stacking direction of the unit cells. On the other hand, the bus bar comprises recessed portions and protruding portions that are formed in a wave shape with respect to a direction that is orthogonal to the stacking direction so as to independently sandwich each of the electrode tabs along the stacking direction. The electrode tab of each unit cell is joined to the bus bar in a state of being independently inserted into the plurality of recessed portions of the bus bar.

SUMMARY

However, in the configuration of Patent Document 1, the position of the distal end portion of the electrode tab is not restricted. Therefore, if there is variation in the thicknesses of the unit cells to be stacked, the positions of the distal end portions of the electrode tabs deviate relatively from the positions of the recessed portions of the bus bars, which are the joint portions between the electrode tabs and the distal end portions. Consequently, if joining is carried out while the bus bar and the distal end portion of the electrode tab are not sufficiently brought in contact in the joint portion, the joining between the bus bar and the distal end portion of the electrode tab becomes insufficient, and there is the risk that electrical conductivity cannot be secured.

An object of the present invention is to provide a battery pack such that sufficient conduction can be obtained between a bus bar and electrode tabs from each unit cell.

The battery pack of the present invention for achieving the object described above comprises a cell group and a bus bar. The cell group includes a plurality of unit cells stacked in a thickness direction with a cell body, which includes a power generation element and has a flat shape, and an electrode tab protruding out from the cell body, and the distal end portions of the electrode tabs are bent along the stacking direction of the unit cells. The bus bar is shaped in a flat plate shape and joined to the distal end portions of the electrode tabs of the unit cells while facing the distal end portions, and it electrically connects the electrode tabs of at least two of the unit cells to each other. The battery pack further has a restricting member that is disposed between electrode tabs that are adjacent to each other in the stacking direction of the unit cells, and it restricts the positions of the distal end portions of the electrode tabs in the stacking direction.

DETAILED DESCRIPTION OF EMBODIMENTS

Figure 1:
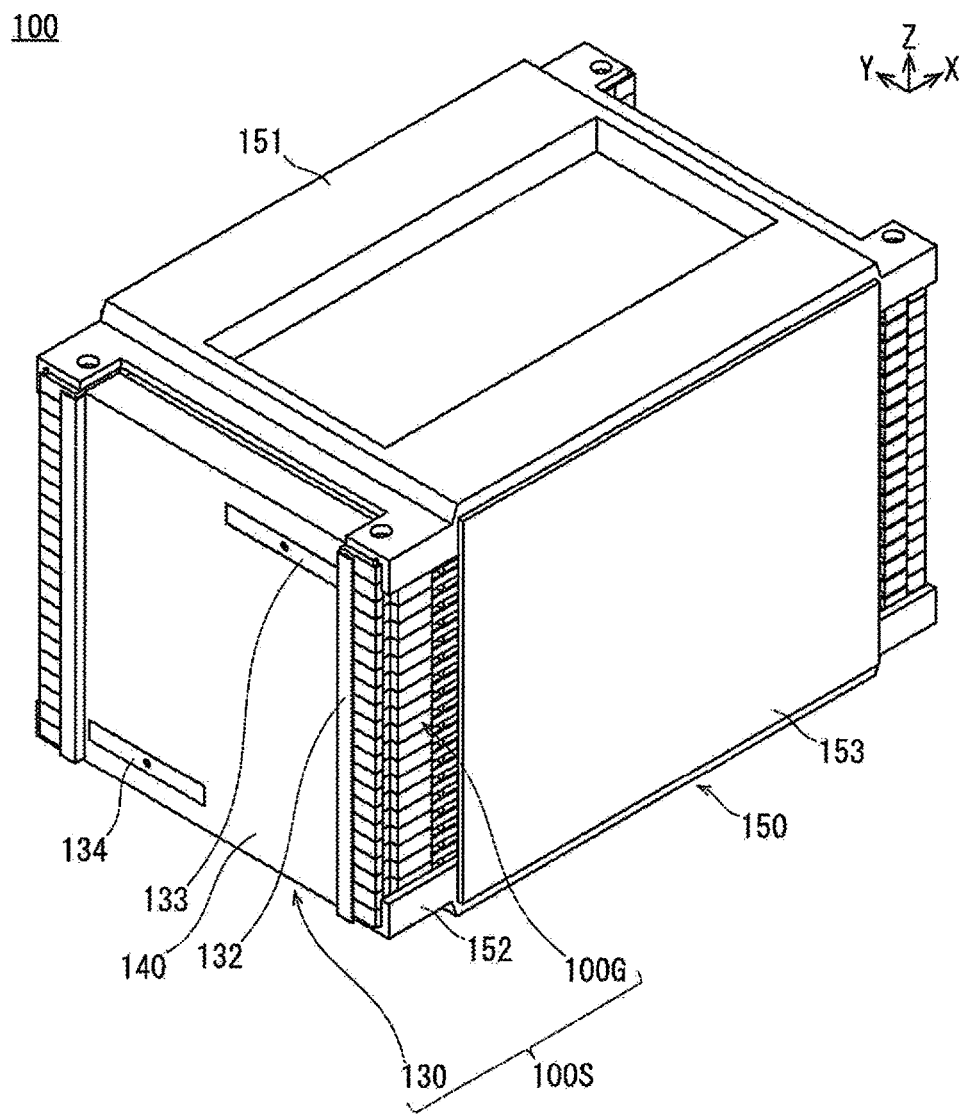
FIG. 1 is a perspective view illustrating the battery pack according to the embodiment.

Embodiments of the present invention will be explained below, with reference to the appended drawings. In the explanations of the drawings, the same elements are given the same reference symbols, and overlapping explanations are omitted. The sizes and ratios of the members in the drawing are exaggerated for convenience of explanation and may be different from the actual sizes and ratios. The orientation is shown using arrows indicated by X, Y, and Z in the drawings. The direction of the arrow indicated by X indicates a direction that intersects with the stacking direction of the unit cell 110, and a direction along the longitudinal direction of the unit cell 110. The direction of the arrow indicated by Y indicates a direction that intersects with the stacking direction of the unit cell 110, and a direction along the short side direction of the unit cell 110. The direction of the arrow indicated by Z is the stacking direction of the unit cell 110.

First, a battery pack 100 according to the present embodiment will be described with reference to FIGS. 1-12.

Figure 2:
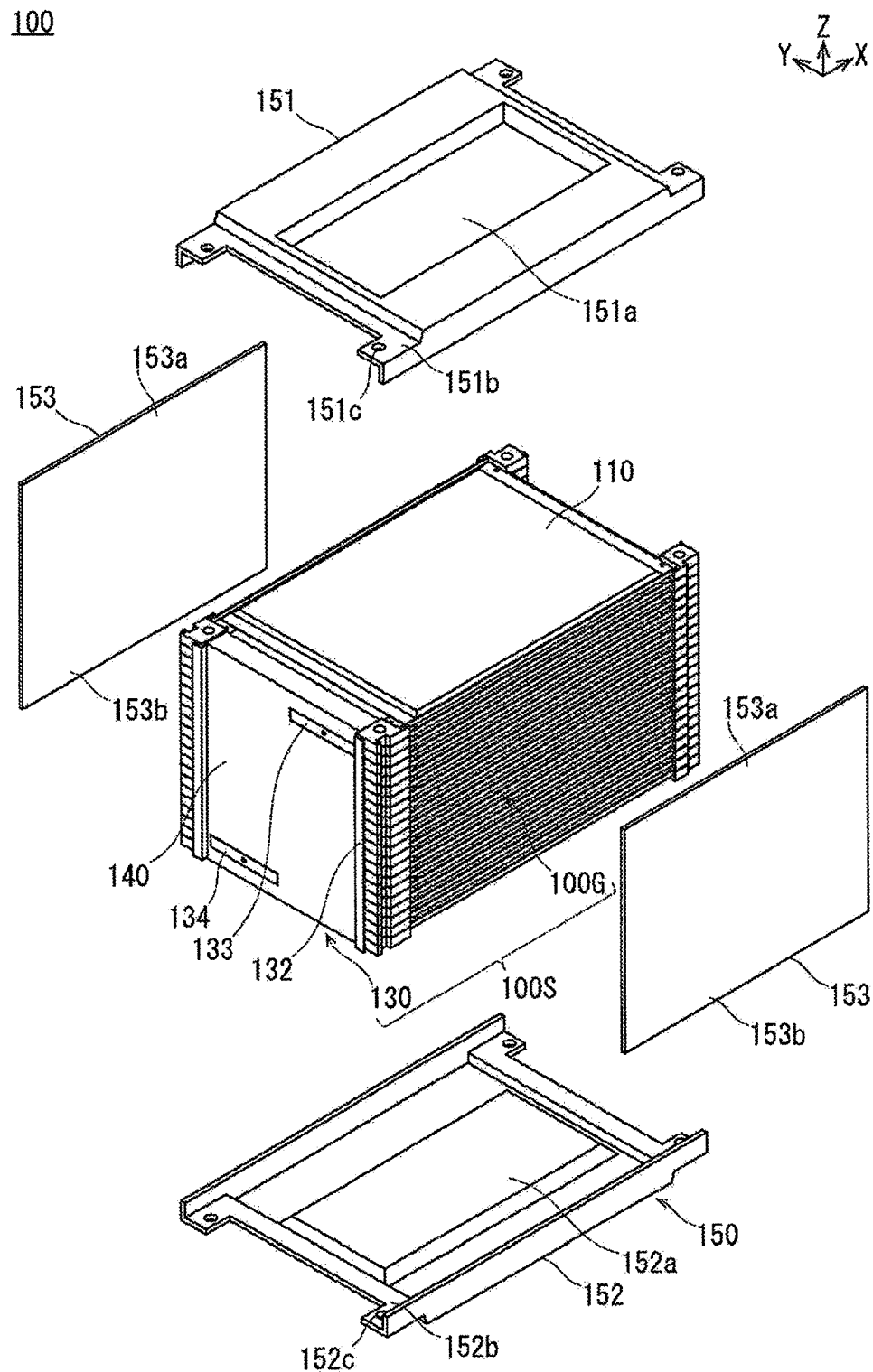
FIG. 2 is a perspective view illustrating a state in which the entire stacked body, in a state in which an upper pressure plate, a lower pressure plate, and left and right side plates are disassembled from the battery pack illustrated in FIG. 1 and a protective cover is attached thereto, is exposed.
Figure 3:
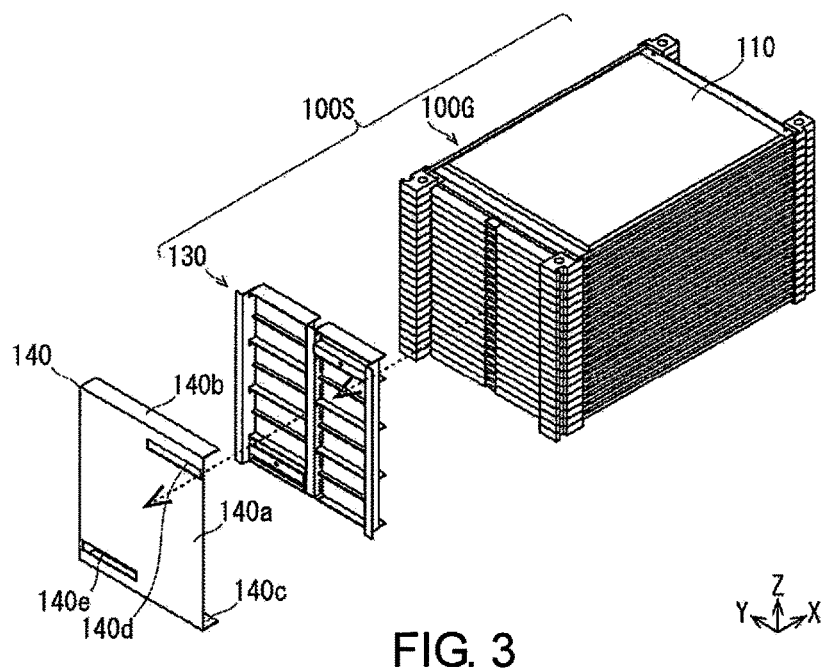
FIG. 3 is a perspective view illustrating a state in which the protective cover is detached from the stacked body illustrated in FIG. 2, and the stacked body is disassembled into a cell group and a bus bar unit.
Figure 4:
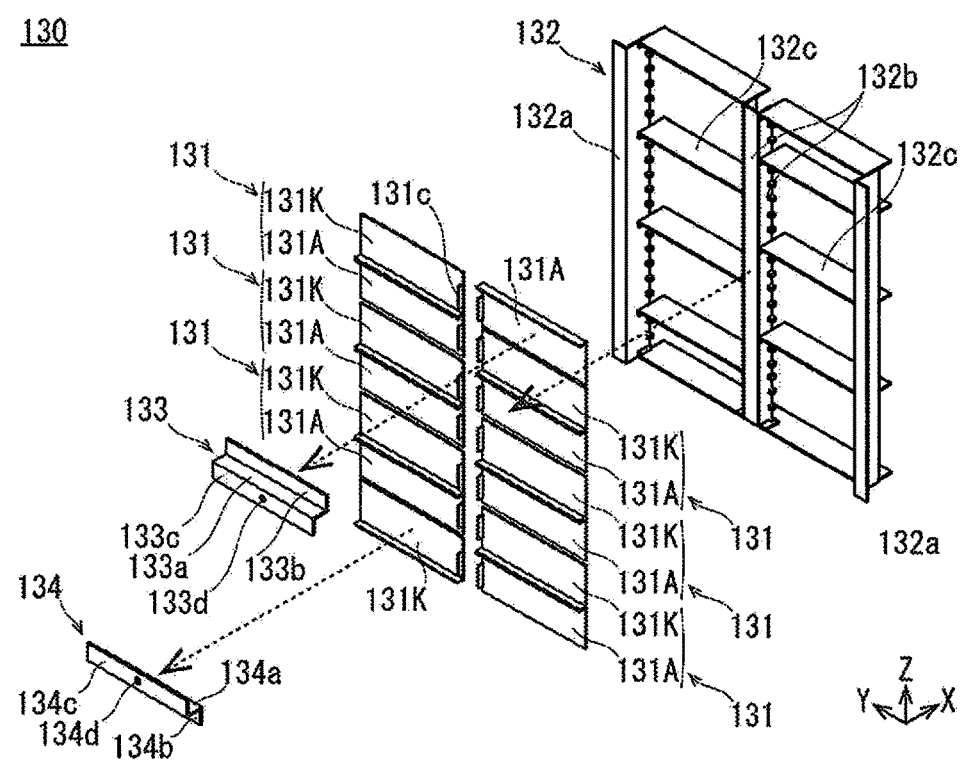
FIG. 4 is an exploded perspective view illustrating the bus bar unit illustrated in FIG. 3.
Figure 5A:
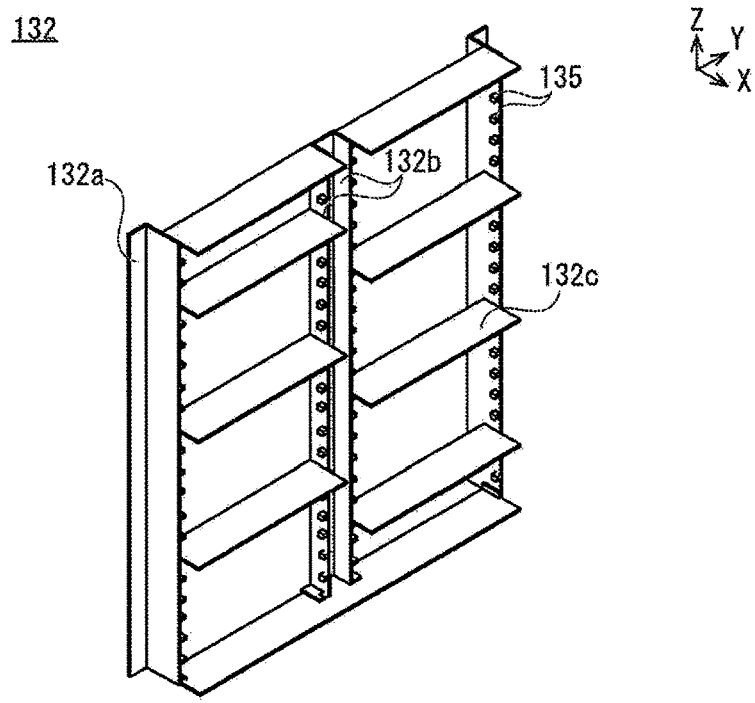
FIG. 5A is a perspective view illustrating a bus bar holder.
Figure 5B:
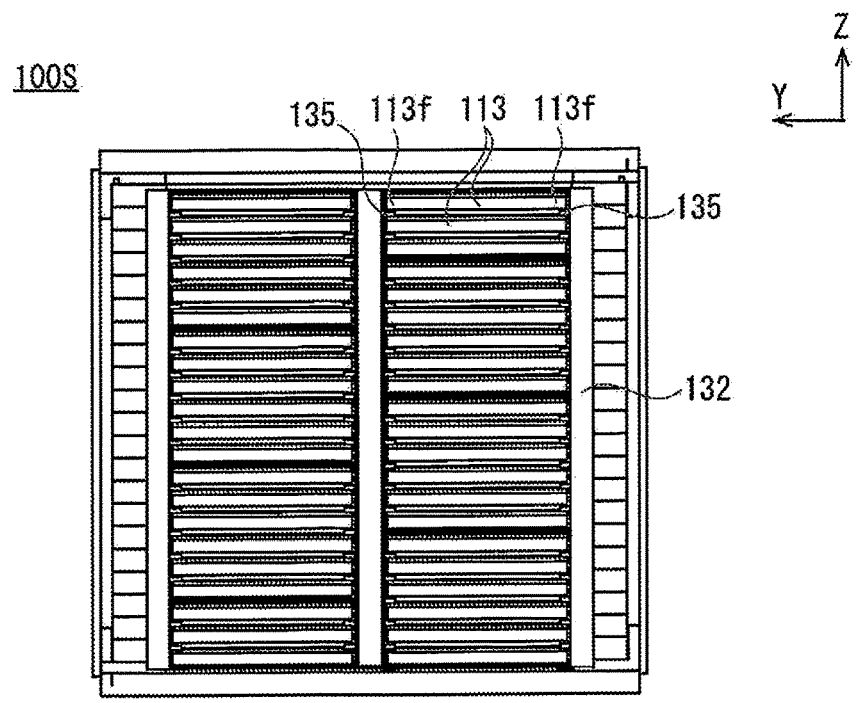
FIG. 5B is a front view illustrating the stacked body without the bus bar.
Figure 6:
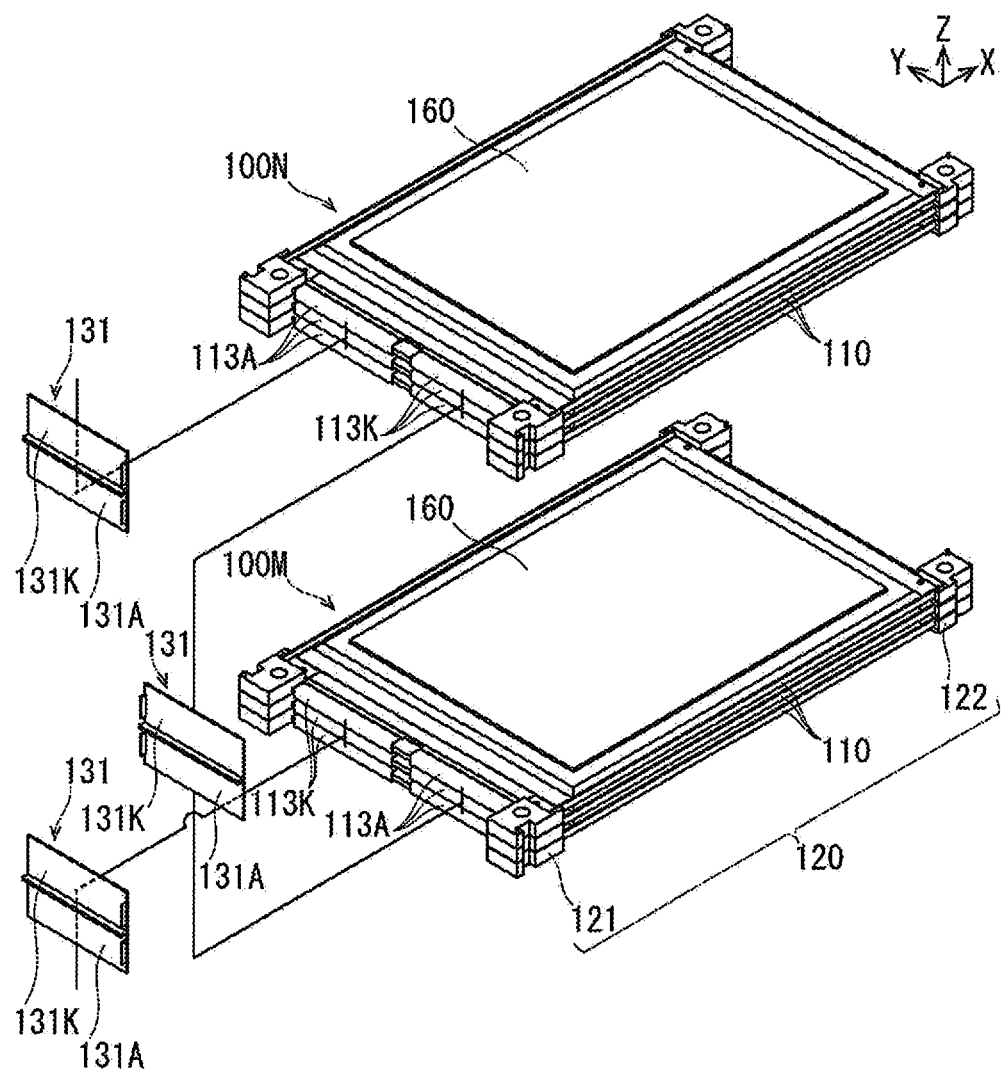
FIG. 6 is an exploded perspective view schematically illustrating a state in which an anode side electrode tab of a first cell sub-assembly (set of three of the unit cells connected in parallel) and a cathode side electrode tab of a second cell sub-assembly (set of three of the unit cells connected in parallel) are joined by using a bus bar.
Figure 7A:
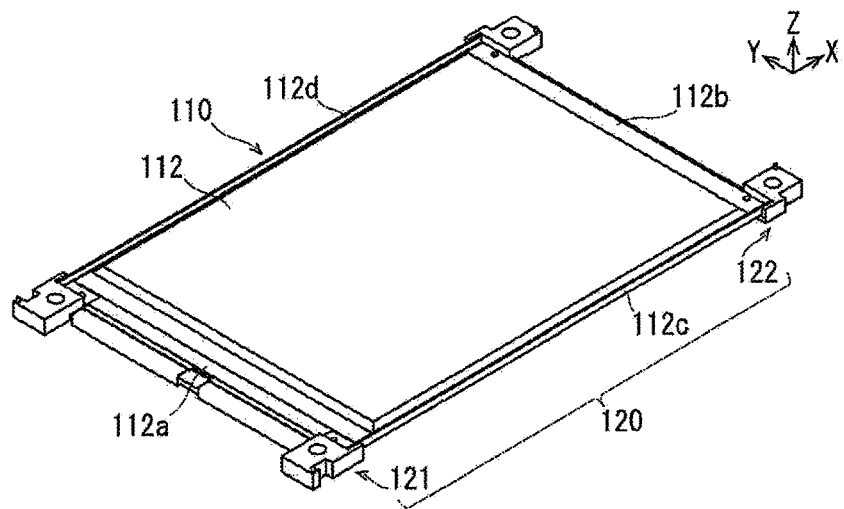
FIG. 7A is a perspective view illustrating a state in which a pair of spacers (first spacer and second spacer) is attached to a unit cell.
Figure 7B:
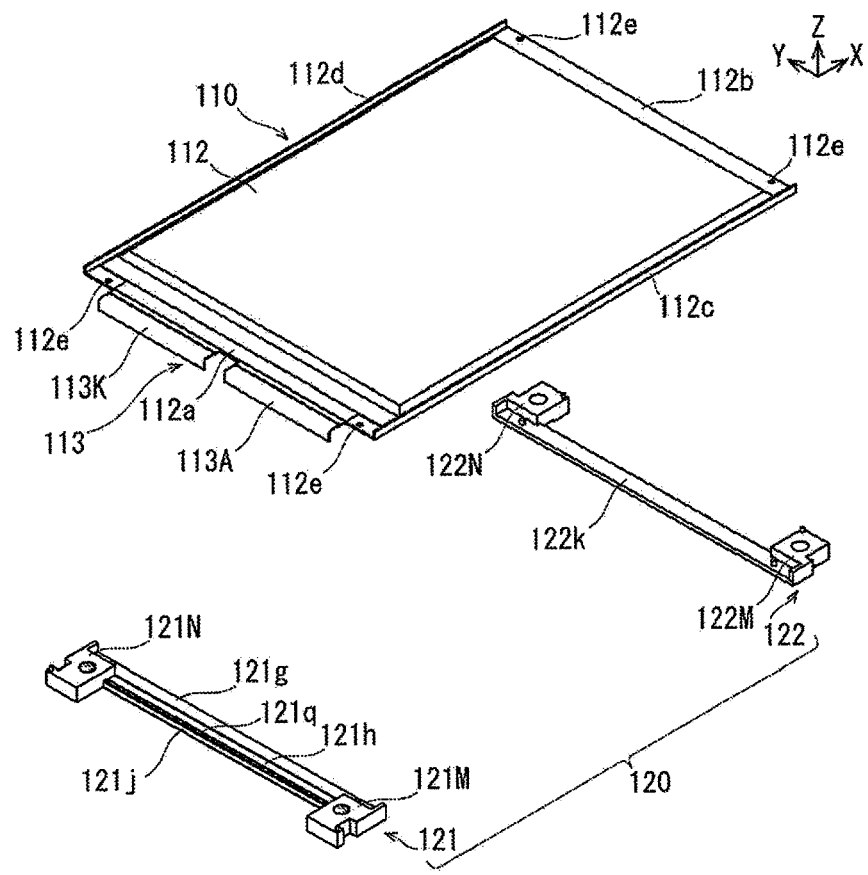
FIG. 7B is a perspective view illustrating a state before the pair of spacers (first spacer and second spacer) is attached to the unit cell.
Figure 8:
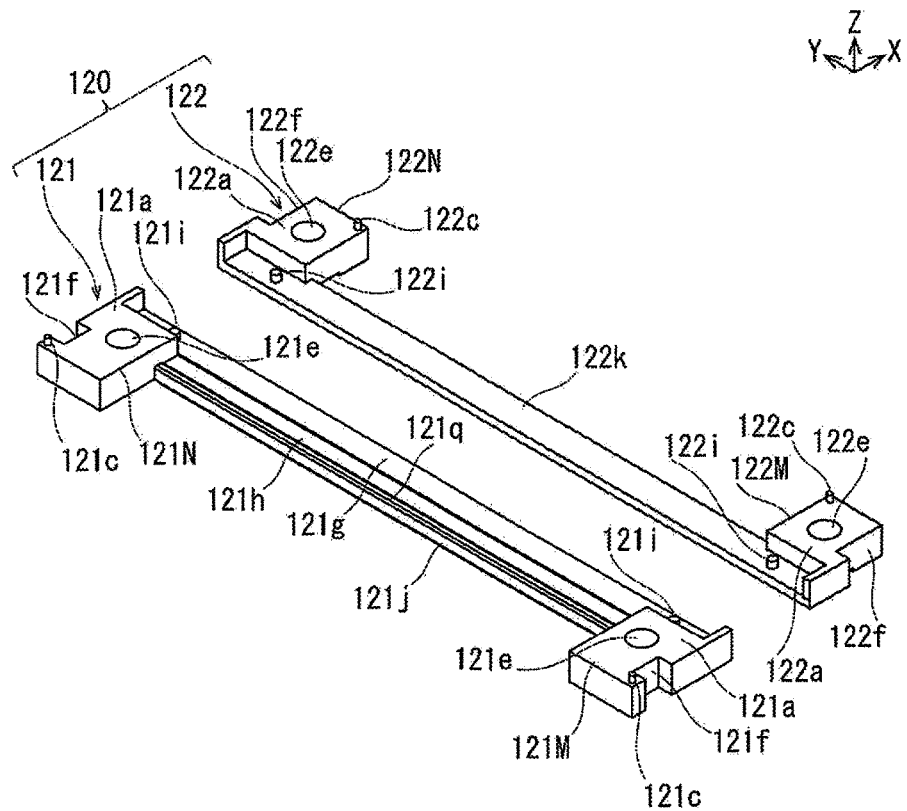
FIG. 8 is a perspective view illustrating the pair of spacers (first spacer and second spacer).
Figure 9A:
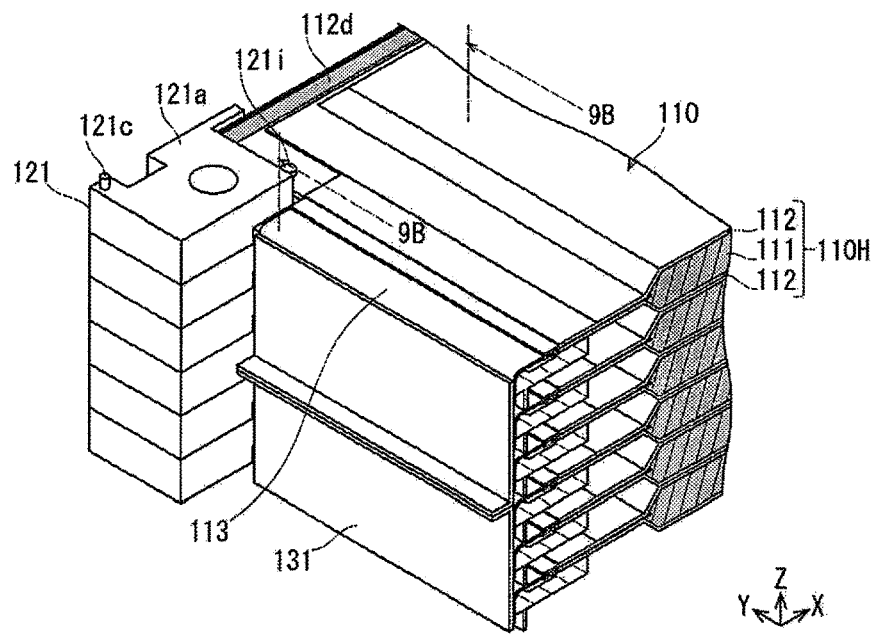
FIG. 9A is a perspective view illustrating a cross-section of the principle part of a state in which a bus bar is joined to the electrode tabs of stacked unit cells.
Figure 9B:
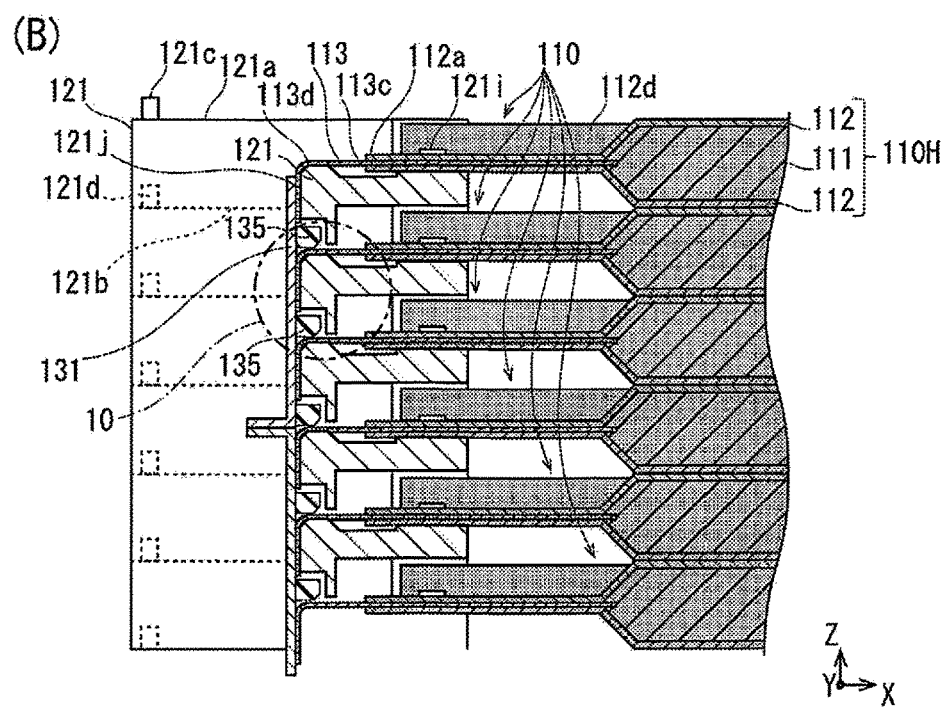
FIG. 9B is a cross-sectional view taken along the 9B-9B line in FIG. 9A.
Figure 10:
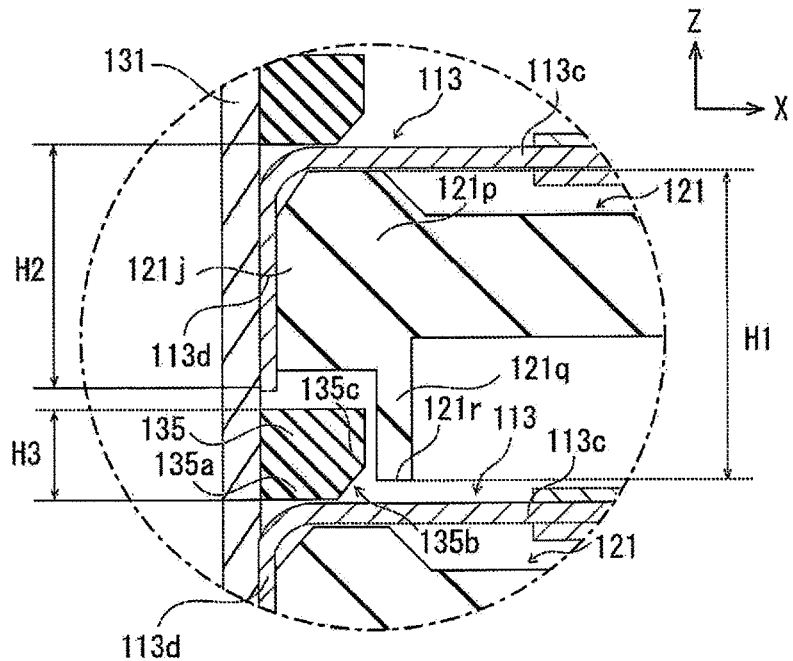
FIG. 10 is an enlarged cross-sectional view of region 10 illustrated in FIG. 9B.
Figure 11:
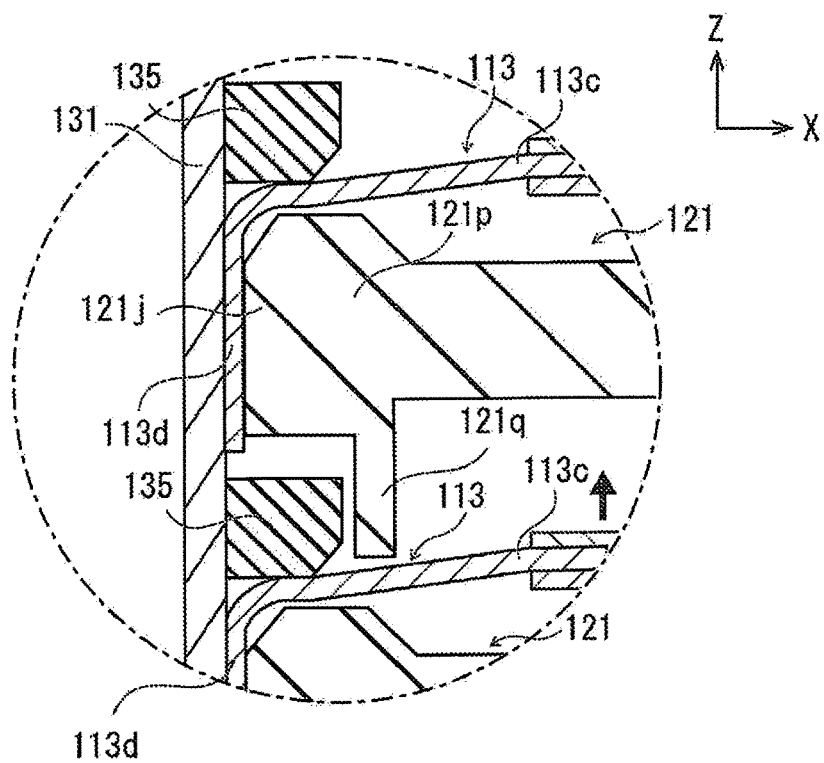
FIG. 11 is a cross-sectional view corresponding to FIG. 10, illustrating a state in which the unit cells are shifted in the stacking direction.
Figure 12A:
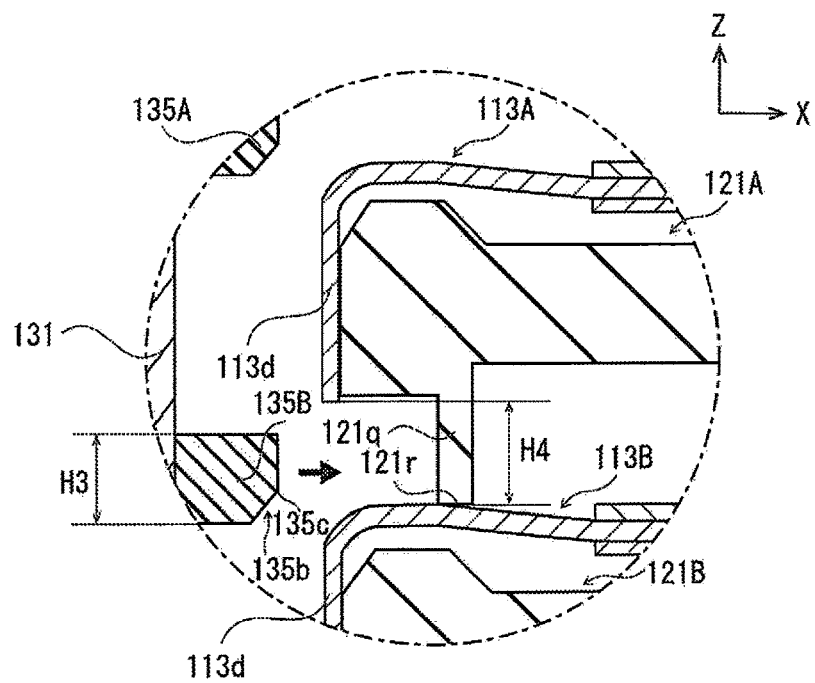
FIG. 12A is a cross-sectional view corresponding to FIG. 10, illustrating a state before disposing of a restricting member between the electrode tabs.
Figure 12B:
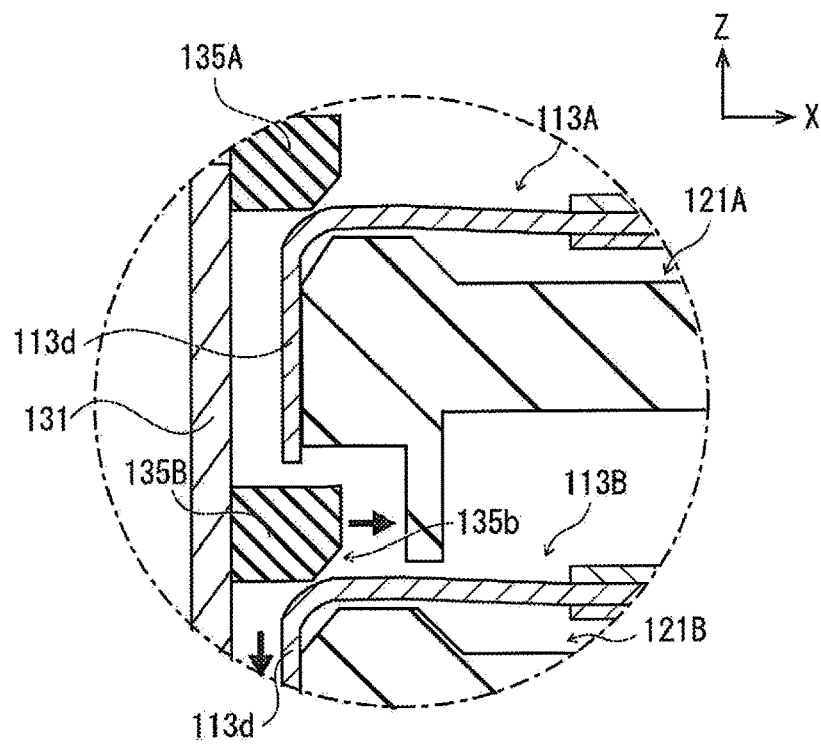
FIG. 12B is a cross-sectional view corresponding to FIG. 10 illustrating a state in which the restricting member is disposed between the electrode tabs.

FIG. 1 is a perspective view illustrating the battery pack 100 according to the present embodiment. FIG. 2 is a perspective view illustrating a state in which the entire stacked body 100S, in a state in which an upper pressure plate 151, a lower pressure plate 152, and left and right side plates 153 are disassembled from the battery pack 100 illustrated in FIG. 1 and a protective cover 140 is attached thereto, is exposed. FIG. 3 is a perspective view illustrating a state in which the protective cover 140 is detached from the stacked body 100S illustrated in FIG. 2, and the stacked body 100S is disassembled into a cell group 100G and a bus bar unit 130. FIG. 4 is an exploded perspective view illustrating the bus bar unit 130 illustrated in FIG. 3. FIG. 5A is a perspective view illustrating a bus bar holder 132, and FIG. 5B is a front view illustrating the stacked body 100S without the bus bar. FIG. 6 is an exploded perspective view schematically illustrating a state in which an anode side electrode tab 113A of a first cell sub-assembly 100M (set of three of the unit cells 110 connected in parallel) and a cathode side electrode tab 113K of a second cell sub-assembly 100N (set of three of the unit cells 110 connected in parallel) are joined by using a bus bar 131. FIG. 7A is a perspective view illustrating a state in which a pair of the spacers 120 (the first spacer 121 and the second spacer 122) is attached to the unit cell 110, and FIG. 7B is a perspective view illustrating a state before the pair of the spacers 120 (the first spacer 121 and the second spacer 122) is attached to the unit cell 110. FIG. 8 is a perspective view illustrating the pair of the spacers 120 (the first spacer 121 and the second spacer 122). FIG. 9A is a perspective view illustrating a cross-section of the principle part of a state in which the bus bar 131 is joined to the electrode tabs 113 of the stack of the unit cells 110, and FIG. 9B is a cross-sectional view taken along the 9B-9B line in FIG. 9A. FIG. 10 is an enlarged cross-sectional view of region 10 illustrated in FIG. 9B. FIG. 11 is a cross-sectional view corresponding to FIG. 10, illustrating a state in which the unit cells 110 are shifted in the stacking direction Z. FIG. 12A is a cross-sectional view corresponding to FIG. 10, illustrating a state before disposing of a restricting member 135 between the electrode tabs 113, and FIG. 12B is a cross-sectional view corresponding to FIG. 10 illustrating a state in which the restricting member 135 is disposed between the electrode tabs 113.

In the state illustrated in FIG. 1, the left front side is referred to as the "front side" of the entire battery pack 100 and of each component part, the right rear side is referred to as the "rear side" of the entire battery pack 100 and of each component part, and the right front side and the left rear side are referred to as the left and right "lateral sides" of the entire battery pack 100 and of each component part.

The battery pack 100 comprises the stacked body 100S including the cell group 100G formed by stacking a plurality of the unit cells 110 having a flat shape in the thickness direction, as illustrated in FIG. 1 and FIG. 2. The battery pack 100 further comprises a protective cover 140 attached to the front side of the stacked body 100S, and a chassis 150 that houses the stacked body 100S in a state in which each of the unit cells 110 is pressurized along the stacking direction Z of the unit cells 110. The stacked body 100S comprises the cell group 100G and the bus bar unit 130 attached to the front side of the cell group 100G and that integrally holds a plurality of the bus bars 131, as illustrated in FIG. 3. The protective cover 140 covers and protects the bus bar unit 130. The bus bar unit 130 comprises a plurality of the bus bars 131 and a bus bar holder 132 that integrally attaches the plurality of the bus bar 131 in a matrix, as illustrated in FIG. 4. Of the plurality of the bus bars 131, an anode side terminal 133 is attached to the terminal end on the anode side, and a cathode side terminal 134 is attached to the terminal end on the cathode side.

Generally, the battery pack 100 of the present embodiment comprises the cell group 100G formed by stacking a plurality of the unit cells 110 in the thickness direction and a bus bar 131 that electrically connects the electrode tabs 113 of at least two of the unit cells 110 to each other. The unit cell 110 comprises a cell body 110H, which includes a power generation element 111 having a flat shape, and an electrode tab 113 protruding out from the cell body 110H. The distal end portion 113d of the electrode tab 113 is bent along the stacking direction Z of the unit cells 110. The bus bar 131 is shaped in a flat plate shape and joined to the distal end portions 113d of the electrode tabs 113 while facing the distal end portions 113d of the electrode tabs 113 of the unit cells 110, and electrically connects the electrode tabs 113d to each other. The battery pack 100 further has a restricting member 135 that is disposed between electrode tabs 113 and restricts the positions of the electrode tabs 113 in the stacking direction Z. The battery pack 100 of the present embodiment will be described in detail below.

The cell group 100G is configured by connecting, in series, the first cell sub-assembly 100M comprising three of the unit cells 110 electrically connected in parallel and a second cell sub-assembly 100N comprising three different ones of the unit cells 110 electrically connected in parallel by using the bus bar 131, as illustrated in. FIG. 6.

The first cell sub-assembly 100M and the second cell sub-assembly 100N have the same configuration, excluding the bent directions of the distal end portions 113d of the electrode tabs 113 of the unit cells 110. Specifically, the second cell sub-assembly 100N is one in which the top and bottom of the unit cells 110 included in the first cell sub-assembly 100M are reversed. However, the bent direction of the distal end portions 113d of the electrode tabs 113 of the second cell sub-assembly 100N is aligned on the lower side of the stacking direction Z so as to be the same as the bent direction of the distal end portions 113d of the electrode tabs 113 of the first cell sub-assembly 100M. A pair of the spacers 120 (the first spacer 121 and the second spacer 122) is attached to each of the unit cells 110.

The unit cell 110 corresponds to, for example, a flat lithium ion secondary battery. The unit cell 110 comprises a cell body 110H obtained by sealing a power generation element 111 with a pair of laminate films 112, and a thin plate shaped electrode tab 113 that is electrically connected to the power generation element 111 and protruding out from the cell body 110H to the outside, as illustrated in FIG. 7 and FIG. 9.

The power generation element 111 is formed by stacking a plurality of layers in which a positive electrode and a negative electrode are sandwiched by separators. The power generation element 111 is charged by receiving a supply of electric power from the outside, then it supplies electric power to an external electrical device while discharging.

The laminate film 112 is configured by covering both sides of a metal foil with a sheet having an insulating property. The pair of laminate films 112 covers the power generation element 111 from both sides along the stacking direction Z to seal the four sides thereof. In the pair of laminate films 112, an anode side electrode tab 113A and a cathode side electrode tab 113K are protruding out from between end portions 112a along the short side direction Y to the outside, as illustrated in FIG. 7 and FIG. 9.

In the laminate film 112, a pair of connecting pins 121i of the first spacer 121 is respectively inserted into a pair of connecting holes 112e respectively provided on both ends of the end portion 112a along the short side direction Y, as illustrated in FIG. 7 and FIG. 8. On the other hand, in the laminate film 112, a pair of connecting pins 122i is respectively inserted in a pair of connecting holes 112e respectively provided on both ends of the other end portion 112b along the short side direction Y. In the laminate film 112, two end portions 112c and 112d along the longitudinal direction X are formed bent upward in the stacking direction Z. In the laminate film 112, two end portions 112c and 112d along the longitudinal direction X are formed bent downward in the stacking direction Z.

The electrode tab 113 is configured from an anode side electrode tab 113A and a cathode side electrode tab 113K, which respectively extend from between the end portion 112a of a pair of laminate films 112 toward the outside, in a state of being separated from each other, as illustrated in FIG. 7 and FIG. 9. The anode side electrode tab 113A is made of aluminum, in accordance with the characteristics of the anode side component members in the power generation element 111. The cathode side electrode tab 113K is made of copper, in accordance with the characteristics of the cathode side component members in the power generation element 111.

The electrode tab 113 is formed in an L shape from a proximal end portion 113c adjacent to the cell body 110H to the distal end portion 113d, as illustrated in FIG. 9. Specifically, the electrode tab 113 extends from the proximal end portion 113c thereof along one side in the longitudinal direction X. On the other hand, the distal end portion 113d of the electrode tab 113 is bent downward along the stacking direction Z. The shape of the distal end portion 113d of the electrode tab 113 is not limited to an L shape. The distal end portion 113d of the electrode tab 113 is formed in a planar shape so as to face the bus bar 131. The electrode tab 113 can be formed in a U shape by further extending the distal end portion 113d and bending the extended portion along the proximal end portion 113c on the cell body 110H side. On the other hand, the proximal end portion 113c of the electrode tab 113 can be formed in a wave shape or a curved shape.

In the plurality of stacked unit cells 110, the distal end portion 113d of each electrode tab 113 is aligned and bent downward in the stacking direction Z, as illustrated in FIG. 7. Here, in the battery pack 100, three of the unit cells 110 electrically connected in parallel (first cell sub-assembly 100M) and three different ones of the unit cells 110 electrically connected in parallel (second cell sub-assembly 100N) are connected in series, as illustrated in FIG. 6. Therefore, the top and bottom of the unit cells 110 are interchanged every three of the unit cells 110, such that the positions of the anode side electrode tabs 113A and the cathode side electrode tabs 113K of the unit cells 110 crisscross along the stacking direction Z.

However, if the top and bottom are simply interchanged every three of the unit cells 110, the positions of the distal end portions 113d of the electrode tabs 113 will vary in the vertical direction along the stacking direction Z; therefore, all of the distal end portions 113d of the electrode tabs 113 of the unit cells 110 are adjusted and bent so that the positions thereof will be aligned.

In the first cell sub-assembly 100M illustrated in the lower part of FIG. 6, the anode side electrode tab 113A is disposed on the right side of the drawing and the cathode side electrode tab 113K is disposed on the left side of the drawing. On the other hand, in the second cell sub-assembly 100N illustrated in the upper part of FIG. 6, the cathode side electrode tab 113K is disposed on the right side of the drawing and the anode side electrode tab 113A is disposed on the left side of the drawing.

In this manner, even if the arrangement of the anode side electrode tab 113A and the cathode side electrode tab 113K is different, the distal end portion 113d of the electrode tab 113 of the unit cell 110 is bent downward along the stacking direction Z. In addition, the distal end portions 113d of the electrode tabs 113 are arranged on the same side of the stacked body 100S, as illustrated in FIG. 3. A double-sided tape 160 that is joined to a stacking member to be stacked above is adhered to the unit cells 110 positioned on the upper surfaces of the first cell sub-assembly 100M and the second cell sub-assembly 100N.

A pair of the spacers 120 (the first spacer 121 and the second spacer 122) is disposed between stacked unit cells 110, as illustrated in FIGS. 3, 6, and 9. The first spacer 121 is disposed along one end portion 112a of the laminate film 112 where the electrode tab 113 of the unit cell 110 protrudes, as illustrated in FIG. 7. The second spacer 122 is disposed along the other end portion 112b of the laminate film 112, as illustrated in FIG. 7. The second spacer 122 has a configuration in which the shape of the first spacer 121 is simplified. A plurality of the unit cells 110 are stacked in the stacking direction Z, after attaching a pair of the spacers 120 (the first spacer 121 and the second spacer 122) to each. The pair of the spacers 120 (the first spacer 121 and the second spacer 122) is made of reinforced plastics having insulating properties. Below, after describing the configuration of the first spacer 121, the configuration of the second spacer 122 will be described while comparing with the configuration of the first spacer 121.

The first spacer 121 is formed of a rectangular parallelepiped shape, elongated along the short side direction Y, as illustrated in FIG. 7 and FIG. 8. The first spacer 121 is provided with placing portions 121M and 121N on the two ends in the longitudinal direction thereof (short side direction Y).

When the first spacer 121 is stacked in a state of being attached to a unit cell 110, the upper surfaces 121a of the placing portions 121M and 121N of a first spacer 121 and the lower surfaces 121b of the placing portions 121M and 121N of another first spacer 121 disposed above said first spacer 121 come in contact, as illustrated in FIG. 9B.

In the first spacer 121, in order to relatively position the plurality of the unit cells 110 to be stacked, a positioning pin 121c provided on the upper surface 121a of one first spacer 121 is fitted with a positioning hole 121d that is opened on the lower surface 121b of another first spacer 121 and that corresponds to the position of the positioning pin 121c, as illustrated in FIG. 8 and FIG. 9B.

In the first spacer 121, a locating hole 121e for inserting a bolt that connects a plurality of battery packs 100 to each other along the stacking direction Z is opened in each of the placing portions 121M and 121N along the stacking direction Z, as illustrated in FIG. 8.

The first spacer 121 is formed such that the region between the placing portions 121M and 121N is notched from the upper side of the stacking direction Z, as illustrated in FIG. 7B and FIG. 8. The notched portion is provided with a first supporting surface 121g and a second supporting surface 121h along the longitudinal direction of the first spacer 121 (short side direction Y of the unit cell 110). The first supporting surface 121g is formed higher along the stacking direction Z and positioned further on the unit cell 110 side than the second supporting surface 121h.

The first spacer 121 carries and supports the end portion 112a of the laminate film 112, in which the electrode tab 113 is protruded, with the first supporting surface 121g, as illustrated in FIG. 7. The first spacer 121 is provided with a pair of connecting pins 121i protruding upward from both ends of the first supporting surface 121g.

The second spacer 122 has a configuration in which the shape of the first spacer 121 is simplified, as illustrated in FIG. 7 and FIG. 8. The second spacer 122 corresponds to a configuration in which a portion of the first spacer 121 is removed along the short side direction Y of the unit cell 110. Specifically, the second spacer 122 is configured by replacing the second supporting surface 121h and the first supporting surface 121g of the first spacer 121 with another supporting surface 122k. Specifically, the second spacer 122 is provided with placing portions 122M and 122N, in the same manner as the first spacer 121. The second spacer 122 is provided with the supporting surface 122k in the portion in which the region between the placing portions 122M and 122N is notched from the upper side of the stacking direction Z. The supporting surface 122k carries and supports the other end portion 112b of the laminate film 112. The second spacer 122 is provided with a positioning pin 122c, a positioning hole, a locating hole 122e, and a connecting pin 122i, in the same manner as the first spacer 121.

The bus bar unit 130 is integrally provided with a plurality of bus bars 131, as illustrated in FIG. 3 and FIG. 4. The bus bar 131 is made of a metal having electrical conductivity and electrically connects the distal end portions 113d of the electrode tabs 113 of different unit cells 110 to each other. The bus bar 131 is formed in a flat plate shape and is erected along the stacking direction Z.

The bus bar 131 is integrally formed by joining an anode side bus bar 131A that is laser-welded to an anode side electrode tab 113A of one of the unit cells 110 and a cathode side bus bar 131K that is laser-welded with a cathode side electrode tab 113K of another unit cell 110 adjacent along the stacking direction Z.

The anode side bus bar 131A and the cathode side bus bar 131K have the same shape and are respectively formed in an L shape, as illustrated in FIG. 4 and FIG. 9. The anode side bus bar 131A and the cathode side bus bar 131K are superimposed with the top and bottom inverted. Specifically, the bus bar 131 is integrated by joining the bent portion of the one end portion of the anode side bus bar 131A along the stacking direction Z to the bent portion of the one end portion of the cathode side bus bar 131K along the stacking direction Z. The anode side bus bar 131A and the cathode side bus bar 131K are each provided with side portions 131c at one end in the short side direction Y along the longitudinal direction X, as illustrated in FIG. 4. The side portions 131c are joined to the bus bar holder 132.

The anode side bus bar 131A is made of aluminum, in the same manner as the anode side electrode tab 113A. The cathode side bus bar 131K is made of copper, in the same manner as the cathode side electrode tab 113K. The anode side bus bar 131A and the cathode side bus bar 131K, made of different metals, are joined to each other by using ultrasonic joining.

For example, if the battery pack 100 is configured by connecting, in series, a plurality of sets of three of the unit cells 110 connected in parallel, as illustrated in FIG. 6, the anode side bus bar 131A portion of the bus bar 131 is laser-welded with the anode side electrode tabs 113A of three of the unit cells 110 that are adjacent to each other along the stacking direction Z. In the same manner, the cathode side bus bar 131K portion of the bus bar 131 is laser-welded with the cathode side electrode tabs 113K of three of the unit cells 110 that are adjacent to each other along the stacking direction Z.

However, of the bus bars 131 arranged in a matrix shape, the bus bar 131 positioned on the upper right in the drawing in FIG. 3 and FIG. 4 corresponds to the anode side terminal ends of 21 of the unit cells 110 (3 parallel 7 series) and is configured from only an anode side bus bar 131A. This anode side bus bar 131A is laser-welded with the anode side electrode tabs 113A of the three uppermost unit cells 110 of the cell group 100G. In the same manner, of the bus bars 131 arranged in a matrix shape, the bus bar 131 positioned on the lower left in the drawing in FIG. 3 and FIG. 4 corresponds to the cathode side terminal ends of 21 of the unit cells 110 (3 parallel 7 series) and is configured from only a cathode side bus bar 131K. This cathode side bus bar 131K is laser-welded with the cathode side electrode tabs 113K of the three lowermost unit cells 110 of the cell group 100G.

The bus bar holder 132 integrally holds a plurality of bus bars 131 in a matrix so as to face the electrode tab 113 of each of a plurality of stacked unit cells 110, as illustrated in FIG. 3. The bus bar holder 132 is made of resin having insulating properties and is formed in a frame shape.

The bus bar holder 132 is respectively provided with a pair of columnar support portions 132a erected along the stacking direction Z, so as to be positioned on both sides of the longitudinal direction of the first spacers 121 that support the electrode tabs 113 of the unit cells 110, as illustrated in FIG. 4. The pair of columnar support portions 132a is fitted to the side surfaces of the placing portions 121M and 121N of the first spacer 121. The pair of columnar support portions 132a has an L shape when viewed along the stacking direction Z and is formed in a plate shape extended along the stacking direction Z. The bus bar holder 132 is provided with a pair of auxiliary columnar support portions 132b at an interval, erected along the stacking direction Z so as to be positioned in the vicinity of the center of the first spacer 121 in the longitudinal direction. The pair of auxiliary columnar support portions 132b is formed in a plate shape extended along the stacking direction Z.

The bus bar holder 132 comprises insulating portions 132c that respectively protrude between adjacent bus bars 131 along the stacking direction Z, as illustrated in FIG. 4. The insulating portions 132c are formed in a plate shape extended along the short side direction Y. Each of the insulating portions 132c is provided horizontally between the columnar support portion 132a and the auxiliary columnar support portion 132b. The insulating portion 132c prevents discharge by insulating the space between the bus bars 131 of the unit cells 110 that are adjacent to each other along the stacking direction Z.

The bus bar holder 132 may be configured by joining the columnar support portion 132a, the auxiliary columnar support portion 132b, and the insulating portion 132c, which are independently formed, or it may be configured by integrally molding the columnar support portion 132a, the auxiliary columnar support portion 132b, and the insulating portion 132c.

The anode side terminal 133 corresponds to the anode side terminal end of the cell group 100G configured by alternately stacking the first cell sub-assembly 100M and the second cell sub-assembly 100N, as illustrated in FIG. 3 and FIG. 4.

The anode side terminal 133 is joined to the anode side bus bar 131A positioned on the upper right in the drawing, from among the bus bars 131 arranged in a matrix, as illustrated in FIG. 3 and FIG. 4. The anode side terminal 133 is made of a metal plate having electrical conductivity and, when viewed along the short side direction Y, has a shape in which the end portion 133b and the other end portion 133c are bent in different directions along the stacking direction Z with reference to the central portion 133a. The end portion 133b is laser-welded to the anode side bus bar 131A. An external input/output terminal is connected to a hole 133d (including the screw groove) opened in the center of the other end portion 133c.

The cathode side terminal 134 corresponds to the cathode side terminal end of the cell group 100G configured by alternately stacking the first cell sub-assembly 100M and the second cell sub-assembly 100N, as illustrated in FIG. 3 and FIG. 4. The cathode side terminal 134 is joined to the cathode side bus bar 131K positioned on the lower left in the drawing, from among the bus bars 131 arranged in a matrix, as illustrated in FIG. 3 and FIG. 4. The cathode side terminal 134 is configured in the same manner as the anode side terminal 133.

The restricting member 135 is disposed between electrode tabs 113 that are adjacent to each other in the stacking direction Z of the unit cells 110, and restricts the positions of the distal end portions 113d of the electrode tabs 113 in the stacking direction Z, as illustrated in FIG. 10. In the present embodiment, the restricting member 135 is disposed between the distal end portions 113d of the electrode tabs 113.

The restricting member 135 is provided on the bus bar holder 132 in the present embodiment, as illustrated in FIG. 5A. In the present embodiment, the restricting member 135 is integrally formed with the bus bar holder 132. However, it is also possible to form the restricting member 135 as a separate body and to attach the restricting member 135 to the bus bar holder 132.

In the present embodiment, the restricting member 135 is disposed on both end portions 113f of the electrode tabs 113 in the width direction, as illustrated in FIG. 5B. The width direction of the electrode tab 113 refers to the direction that intersects with the direction leading from the proximal end portion 113c to the distal end portion 113d of the electrode tab 113 (corresponding to the longitudinal direction X of the unit cell 110) and with the stacking direction Z (corresponding to the short side direction Y of the unit cell 110).

In the present embodiment, a guide portion 135b, which has a slope in which the distance from the electrode tab 113 becomes greater toward the proximal end portion 113c side, is provided from a portion 135a of the restricting member 135 opposing the electrode tab 113 to a portion on the proximal end portion 113c side of the electrode tab 113 (corresponding to the proximal end side), as illustrated in FIG. 10.

The positions of the unit cells 110 can be displaced in the stacking direction Z by the unit cells 110 expanding in the stacking direction Z during use, or by an external force being imparted to the battery pack 100, as illustrated in FIG. 11. As described above, in the battery pack 100 according to the present embodiment, the restricting member 135 is disposed between the electrode tabs 113 to restrict the position of the distal end portions 113d of the electrode tabs 113 in the stacking direction Z. Accordingly, even if the positions of the unit cells 110 are displaced in the stacking direction Z, it is possible to prevent the positions of the distal end portions 113d of the electrode tabs 113 from being displaced from predetermined joining positions, as illustrated in FIG. 11. In addition, even if the positions of the unit cells 110 are displaced in the stacking direction Z, it is possible to maintain the surfaces of the distal end portions 113d of the electrode tabs 113 along the stacking direction Z and the bus bars 131 in a parallel state at the joint portion. Accordingly, it is possible to bring the bus bars 131 and the surface of the distal end portions 113d of the electrode tabs 113 along the stacking direction Z sufficiently in contact at the joint portions with the bus bar 131. As a result, it is possible to improve the joining quality between the electrode tabs 113 and the bus bars 131.

In addition, as described above, the restricting members 135 are disposed between the distal end portions 113d of the electrode tabs 113. Accordingly, the movement of the distal end portions 113d of the electrode tabs 113 is restricted between the restricting members 135. Accordingly, it is possible to more precisely regulate the positions of the distal ends of the electrode tabs 113.

In addition, as described above, the restricting members 135 regulate the movement of the distal end portions 113d of the electrode tabs 113. Accordingly, it is possible to prevent stress from being concentrated on the proximal ends of the electrode tabs 113 when the positions of the unit cells 110 are displaced in the stacking direction Z, compared to a case in which the movement of the proximal end side portion of the electrode tabs 113 are restricted.

Additionally, as described above, the restricting members 135 are provided on the bus bar holder 132, which holds the bus bars 131. Accordingly, it is possible to dispose the restricting members 135 between the electrode tabs 113 at the same time as attaching the bus bars 131, as illustrated in FIG. 12. Accordingly, it becomes easy to dispose the restricting members 135 between the electrode tabs 113. In addition, since it is not necessary to separately prepare an attaching member, etc. for disposing the restricting members 135, it is possible to reduce the number of parts required for disposing the restricting members 135.

In addition, as described above, one of the restricting members 135 is disposed on both end portions 113f of the electrode tabs 113 in the width direction. Accordingly, it is possible to reduce the materials required for the restricting members 135, compared to a case in which the restricting members 135 are provided across the entire width direction of the electrode tabs 113. Accordingly, it is possible to restrict the position of the distal end portions 113d of the electrode tabs 113 at a low cost. In addition, since the contact area between the distal end portions 113d of the electrode tabs 113 and the restricting members 135 can be reduced, it is possible to reduce friction that occurs between the electrode tabs 113 and the restricting members 135 when disposing the restricting members 135 between the electrode tabs 113. Accordingly, it becomes easy to dispose the restricting members 113 between the electrode tabs 135.

Additionally, as described above, each of the portions 135a of the restricting members 135 has the guide portion 135b, which slopes such that a distance from the electrode tab 113 becomes greater toward the proximal end portion 113c, and opposes the electrode tab 113 to a portion on the proximal end portion 113c of the electrode tab 113. Accordingly, it is possible to prevent the restricting members 135 from being caught by the electrode tabs 113 when disposing the restricting members 135 between the electrode tabs 113, as illustrated in FIG. 12. Specifically, even if the distal end portions 113d of the electrode tabs 113 is shifted from a predetermined position, it is possible to smoothly insert the restricting members 135 between the electrode tabs 113 by using the guide portions 135b guiding the electrode tabs 113 such that the distal end portions 113d moves to a predetermined position.

The first spacer 121 will be described in further detail from the viewpoint of its relationship with the restricting member 135, with reference to FIGS. 10-12.

In the present embodiment, the first spacer 121 and the restricting member 135 are configured as separate bodies. The first spacer 121 is disposed in a state of sandwiching an electrode tab 113 with a restricting member 135 and maintains the interval between adjacent electrode tabs 113 by restricting the movement of the electrode tab 113 in a direction different from that of the restricting member 135.

The first spacer 121 comprises a restricting portion 121p disposed facing an electrode tab 113, whose movement is restricted between the restricting member 135 and the first spacer, to restrict the movement of said electrode tab 113, and a leg portion 121q extended from the restricting portion 121p toward a different electrode tab 113 adjacent to said electrode tab 113, to restrict the movement of said different electrode tab 113.

The first spacer 121 is provided with a supporting portion 121j, which abuts the electrode tab 113 from the opposite side of the bus bar 131 and supports the distal end portion 113d of the electrode tab 113 of the unit cell 110, on a side surface of the restricting portion 121p along the stacking direction Z opposing the electrode tab 113, as illustrated in FIG. 10. The supporting portion 121j of the first spacer 121 sandwiches the distal end portion 113d of the electrode tab 113 together with the bus bar 131 such that the distal end portion 113d and the bus bar 131 are sufficiently abutting each other.

In the present embodiment, a gap is formed between the leg portion 121q of the first spacer 121 and the electrode tab 113 whose movement is restricted by said leg portion 121q.

In the present embodiment, the distance H1 from the surface of the restricting portion 121p opposing the electrode tab 113 to the distal end portion 121r of the leg portion 121q is greater than the sum of the length H2 of the portion of the distal end portion 113d of the electrode tab 113 along the stacking direction Z opposing the restricting portion 121p and the length H3 in the stacking direction Z of the restricting member 135 disposed between said electrode tab 113 and an electrode tab 113 adjacent to said electrode tab 113.

In the present embodiment, the portion 135c of the guide portion 135b of the restricting member 135 most separated from the electrode tab 113 is in a position farther away from the electrode tab 113 than the distal end portion 121r of the leg portion 121q of the first spacer 121 in the stacking direction Z of the unit cell 110.

As described above, the first spacer 121 is disposed in a state of sandwiching an electrode tab 113 with a restricting member 135 and maintains the interval between adjacent electrode tabs 113 by restricting the movement of the electrode tab 113 in a direction different from that of the restricting member 135. Accordingly, since the movement of the distal end portion 113d of the electrode tab 113 can be limited between the restriction member 135 and the first spacer 121, it is possible to more precisely regulate the position of the distal end side of the electrode tab 113. Additionally, since the movement of the electrode tab 113 is limited between the first spacer 121 and the restriction member 135, it is possible to prevent stress from being concentrated on the proximal end side of the electrode tab 113 by the electrode tab 113 vibrating during use of the battery pack 100.

In addition, as described above, the first spacer 121 comprises a leg portion 121q. Accordingly, it is possible to prevent a different electrode tab 113B that is adjacent to an electrode tab 113A, whose movement is restricted between a restricting member 135A and a first spacer 121A, from being lifted up to the electrode tab 113A side, as illustrated in FIG. 12A. Accordingly, it is possible to reliably maintain the interval between the electrode tabs 113. As a result, it becomes easier to dispose the restricting member 135 between electrode tabs 113.

Additionally, by providing the first spacer 121 with the leg portion 121q, it is possible to prevent a first spacer 121A from shifting in a direction from an electrode tab 113A toward a different electrode tab 113B adjacent to said electrode tab 113A. Accordingly, when the distal end portion 113d of the electrode tab 113A is joined to the bus bar 131 by laser welding, it is possible to prevent the laser light that is irradiated onto a laser irradiation position from reaching the unit cell side, due to the position of the distal end portion 113d of the electrode tab 113 having deviated from the laser irradiation position.

In addition, as described above, a gap is formed between the leg portion 121q of the first spacer 121 and the electrode tab 113 whose movement is restricted by said leg portion 121q. Accordingly, even if the positions of the unit cells 110 are displaced in the stacking direction Z, it is possible to prevent the leg portion 121q from coming in contact with the electrode tab 113, as illustrated in FIG. 12. Accordingly, it is possible to prevent the generation of locally concentrated stress in the electrode tab 113 by the leg portion 121q of the first spacer 121. In addition, by using a gap being formed between the electrode tab 113 and the leg portion 121q of the first spacer 121, it is possible to prevent condensed moisture from accumulating in the vicinity of the electrode tab 113.

Additionally, as described above, the distance H1 from the surface of the restricting portion 121p opposing the electrode tab 113 to the distal end portion of the leg portion 121q is greater than the sum of the length H2 of the portion of the distal end portion 113d of the electrode tab 113 along the stacking direction Z opposing the restricting portion 121p and the length H3 in the stacking direction of the restricting member 135 disposed between said electrode tab 113 and an electrode tab 113 adjacent to said electrode tab 113 and another electrode tab 113. Accordingly, it is possible to maintain the interval H4 between the distal end portions 113d of the electrode tabs 113 to equal to or greater than the length H3 of the restricting member 135 in the stacking direction Z, as illustrated in FIG. 12A. Accordingly, it becomes easier to dispose the restricting member 135 between the distal end portions 113d of the electrode tabs 113. In FIG. 12A, an example is shown in which both the electrode tab 113A and the electrode tab 113B are lifted up; however, it is obvious that the same effect can be exerted even when the electrode tab 113A is not lifted up.

In addition, as described above, the portion 135c of the guide portion 135b most separated from the electrode tab 113 is in a position farther away from the electrode tab 113 than the distal end portion 121r of the leg portion 121q of the first spacer 121 in the stacking direction Z of the unit cells 110. Accordingly, when inserting the restricting member 135 between electrode tabs 113, it is possible to reliably guide the electrode tab 113B by using the guide portion 135b formed in the restricting member 135B, even if the electrode tab 113B has moved to a position abutting the leg portion 121q of the first spacer 121A, as illustrated in FIG. 12. Accordingly, it becomes easier to dispose the restricting member 135 between electrode tabs 113.

The protective cover 140 prevents the bus bars 131 from short-circuiting with each other and from coming in contact with an external member and being short-circuited or causing electrical leakage, by covering the bus bar unit 130, as illustrated in FIGS. 1-3. Furthermore, the protective cover 140 exposes the anode side terminal 133 and the cathode side terminal 134 to the outside and causes the power generation element 111 of each unit cell 110 to charge and discharge. The protective cover 140 is made of plastics having insulating properties.

The protective cover 140 is formed in a flat plate shape and is erected along the stacking direction Z, as illustrated in FIG. 3. The protective cover 140 has a shape in which the upper end 140b and the lower end 140c of the side surface 140a thereof are bent along the longitudinal direction X, and is fitted to the bus bar unit 130.

The side surface 140a of the protective cover 140 is provided with a first opening 140d formed of a rectangular hole that is slightly larger than the anode side terminal 133, in a position that corresponds to the anode side terminal 133 provided on the bus bar unit 130, as illustrated in FIG. 2 and FIG. 3. In the same manner, the side surface 140a of the protective cover 140 is provided with a second opening 140e formed of a rectangular hole that is slightly larger than the cathode side terminal 134, in a position that corresponds to the cathode side terminal 134 provided on the bus bar unit 130.

The chassis 150 houses the cell group 100G in a state of being pressurized along the stacking direction, as illustrated in FIG. 1 and FIG. 2. An appropriate surface pressure is imparted to the power generation element 111 by sandwiching and pressurizing the power generation element 111 of each unit cell 110 provided on the cell group 100G with the upper pressure plate 151 and the lower pressure plate 152.

The upper pressure plate 151 is disposed above the cell group 100G along the stacking direction Z, as illustrated in FIG. 1 and FIG. 2. The upper pressure plate 151 is provided with a pressing surface 151a protruding downward along the stacking direction Z in the center thereof. The power generation element 111 of each unit cell 110 is pressed downward by the pressing surface 151a. The upper pressure plate 151 is provided with a holding portion 151b extended along the longitudinal direction X from both sides along the short side direction Y. The holding portion 151b covers the placing portions 121M and 121N of the first spacer 121 or the placing portions 122M and 122N of the second spacer 122. A locating hole 151c, which communicates with the positioning hole 121d of the first spacer 121 or the positioning hole 122d of the second spacer 122 along the stacking direction Z, is opened in the center of the holding portion 151b. A bolt that connects battery packs 100 with each other is inserted into the locating hole 151c. The upper pressure plate 151 is made of a metal plate having a sufficient thickness.

The lower pressure plate 152 has the same configuration as the upper pressure plate 151 and is formed by reversing the top and bottom of the upper pressure plate 151, as illustrated in FIG. 1 and FIG. 2. The lower pressure plate 152 is disposed below the cell group 100G along the stacking direction Z. The lower pressure plate 152 presses the power generation element 111 of each unit cell 110 upward with the pressing surface 152a protruding upward along the stacking direction Z.

One pair of the side plates 153 fixes the relative positions of the upper pressure plate 151 and the lower pressure plate 152 such that the upper pressure plate 151 and the lower pressure plate 152, which sandwich and press the cell group 100G from above and below in the stacking direction Z, are not separated from each other, as illustrated in FIG. 1 and FIG. 2. The side plate 153 is made of a rectangular metal plate and is erected along the stacking direction Z. One pair of the side plates 153 is joined to the upper pressure plate 151 and the lower pressure plate 152 from both sides in the short side direction Y of the cell group 100G by laser welding. Each of the side plates 153 is subjected to seam welding or spot welding at the upper end 153a portion that abuts the upper pressure plate 151 along the longitudinal direction X. In the same manner, each of the side plates 153 is subjected to seam welding or spot welding at the lower end 153b portion that abuts the lower pressure plate 152 along the longitudinal direction X. The pair of the side plates 153 covers and protects both sides of the cell group 100G in the short side direction Y.

Next, the manufacturing method of the battery pack 100 will be described, with reference to FIGS. 13-20.

The manufacturing method (manufacturing steps) of the battery pack 100 comprises a stacking step (FIG. 13) for stacking the members configuring the battery pack 100, a pressurizing step (FIG. 14) for pressurizing the cell group 100G of the battery pack 100, a first joining step (FIG. 15) for joining the side plates 153 to the upper pressure plate 151 and the lower pressure plate 152, a second joining step (FIGS. 16-19) for joining the bus bars 131 to the electrode tabs 113 of the unit cells 110 and joining the terminals to the bus bars 131, and a mounting step (FIG. 20) for attaching the protective cover 140 to the bus bars 131.

The stacking step for stacking the members configuring the battery pack 100 will be described, with reference to FIG. 13.

Figure 13:
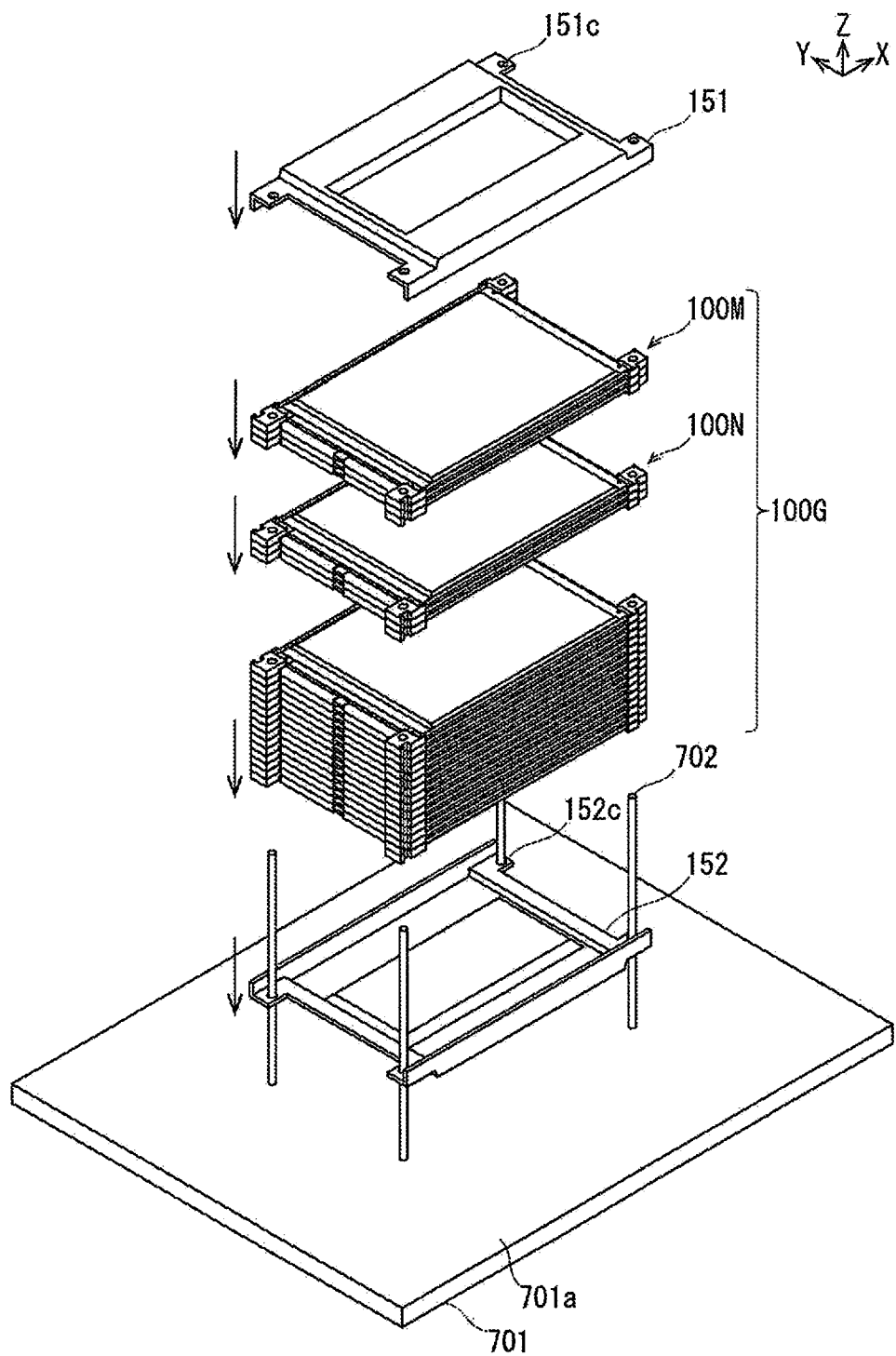
FIG. 13 is a view illustrating the battery pack manufacturing method according to the embodiment, and a perspective view schematically illustrating a state in which members constituting a battery pack are sequentially stacked on a mounting table.

FIG. 13 is a view illustrating the battery pack 100 manufacturing method according to the present embodiment and a perspective view schematically illustrating a state in which members constituting the battery pack 100 are sequentially stacked on a mounting table 701.

The mounting table 701 used for the stacking step is formed in a plate shape and is provided along a horizontal plane. The mounting table 701 comprises locating pins 702 for positioning the relative positions of the lower pressure plate 152, the first cell sub-assembly 100M, the second cell sub-assembly 100N, and the upper pressure plate 151, which are sequentially stacked, along the longitudinal direction X and the short side direction Y. Four locating pins 702 are erected on the upper surface 701*a* of the mounting table 701 with predetermined intervals therebetween. The intervals separating the four locating pins 702 from one another correspond, for example, to the intervals separating the locating holes 152*c* provided on the four corners of the upper pressure plate 151. The members constituting the battery pack 100 are stacked using a robot arm, a hand lifter, a vacuum adsorption type collet, or the like.

In the stacking step, the lower pressure plate 152 is lowered along the stacking direction Z and mounted on the upper surface 701*a* of the mounting table 701, in a state in which the locating holes 152*c* provided on the four corners thereof are inserted into the locating pins 702 by using a robot arm, as illustrated in FIG. 13. Next, the first cell sub-assembly 100M is lowered along the stacking direction Z and mounted on the lower pressure plate 152, in a state in which the locating holes provided on the first spacer 121 and the second spacer 122, which are component members thereof, are inserted into the locating pins 702 by using a robot arm. In the same manner, three sets each of the second cell sub-assembly 100N and the first cell sub-assembly 100M are alternately stacked by using the robot arm. A double-sided tape 160 that is joined to a stacking member to be stacked above is adhered to the upper surfaces of the first cell sub-assembly 100M and the second cell sub-assembly 100N. Then, the upper pressure plate 151 is lowered along the stacking direction Z and stacked on the first cell sub-assembly 100M, in a state in which the locating holes 151*c* provided on the four corners thereof are inserted into the locating pins 702 by using a robot arm.

The pressurizing step for pressurizing the cell group 100G of the battery pack 100 will be described with reference to FIG. 14.

Figure 14:
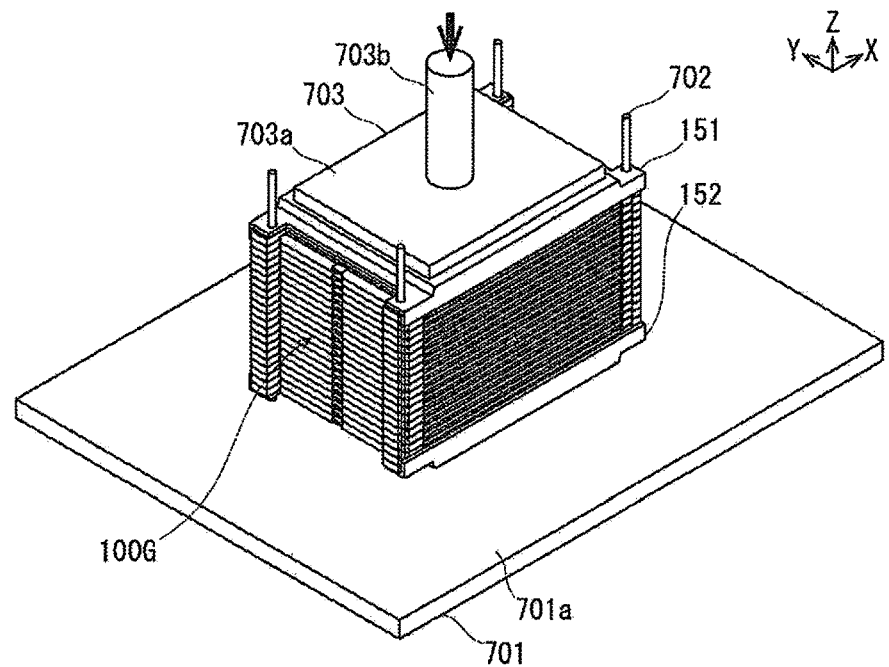
FIG. 14 is a perspective view schematically illustrating a state in which the component members of a battery pack are pressed from above, following FIG. 13.

FIG. 14 is a perspective view schematically illustrating a state in which the component members of a battery pack 100 are pressed from above, following FIG. 13.

A pressurizing jig 703 as used in the pressurizing step comprises a pressurizing portion 703*a* that is formed in a plate shape and provided along a horizontal plane, and a supporting portion 703*b* that is formed in a cylindrical shape and that is erected and joined to the upper surface of the pressurizing portion 703*a*. The supporting portion 703*b* connects a hydraulic cylinder and an electric stage that are driven along the stacking direction Z. The pressurizing portion 703*a* moves above and below along the stacking direction Z via the supporting portion 703*b*. The pressurizing portion 703*a* pressurizes the abutted stacking members.

In the pressurizing step, the pressurizing portion 703*a* of the pressurizing jig 703 is lowered downward along the stacking direction Z while being abutted against the upper pressure plate 151 by the electrical stage connected to the supporting portion 703*b* being driven, as illustrated in FIG. 14. The cell group 100G is sandwiched and pressurized by using the upper pressure plate 151 that is pressed downward and the lower pressure plate 152 that is mounted on the mounting table 701. An appropriate surface pressure is imparted to the power generation element 111 of each unit cell 110 provided on the cell group 100G. The pressurizing step is continued until the next first joining step is completed.

The first joining step in which the side plates 153 are joined to the upper pressure plate 151 and the lower pressure plate 152 will be described with reference to FIG. 15.

Figure 15:
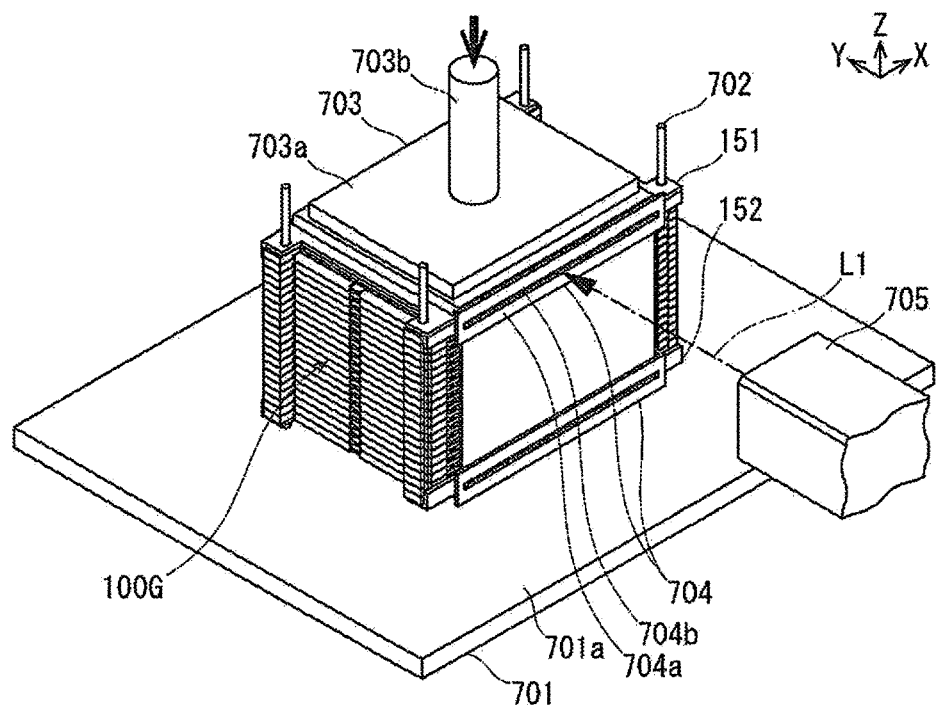
FIG. 15 is a perspective view schematically illustrating a state in which a side plate is laser-welded to an upper pressure plate and a lower pressure plate, following FIG. 14.

FIG. 15 is a perspective view schematically illustrating a state in which the side plates 153 are laser-welded to the upper pressure plate 151 and the lower pressure plate 152, following FIG. 14.

A pushing plate 704 as used in the first joining step respectively presses the side plates 153 against the upper pressure plate 151 and the lower pressure plate 152, to respectively bring the side plates 153 in close contact with the upper pressure plate 151 and the lower pressure plate 152. The pushing plate 704 is made of metal and formed in an elongated plate shape. A linear slit 704*b* is opened in a main body 704*a* of the pushing plate 704 along the longitudinal direction. The short side direction of the pushing plate 704 is erected along the stacking direction Z. The pushing plate 704 presses the side plate 153 with the main body 704*a* and allows laser light L1 for welding to pass through the slit 704*b*.

A laser oscillator 705 is a light source for joining the side plates 153 to the upper pressure plate 151 and the lower pressure plate 152. The laser oscillator 705 is configured from, for example, a YAG (yttrium aluminum garnet) laser. The laser light L1 that is led out from the laser oscillator 705 is irradiated onto the upper end 153*a* and the lower end 153*b* of the side plate 153, in a state in which the light path is adjusted by using, for example, an optical fiber or a mirror, and condensed by using a condenser lens. The laser light L1 that is led out from the laser oscillator 705 may be split by using a half-mirror and irradiated onto the upper end 153*a* and the lower end 153*b* of the side plate 153 at the same time.

In the first joining step, a laser oscillator 705 horizontally scans laser light L1 onto the upper end 153*a* of the side plate 153 that is pressed by the pushing plate 704 via the slit 704*b* of the pushing plate 704, and subjects the side plate 153 and the upper pressure plate 151 to seam welding at a plurality of locations, as illustrated in FIG. 15. In the same manner, the laser oscillator 705 horizontally scans laser light L1 onto the lower end 153*b* of the side plate 153 that is pressed by the pushing plate 704 via the slit 704*b* of the pushing plate 704, and subjects the side plate 153 and the lower pressure plate 152 to seam welding at a plurality of locations.

The second joining step in which the bus bar 131 is joined to the electrode tabs 113 of the unit cell 110 and the terminal is joined to the bus bar 131 will be described with reference to FIGS. 16-19.

Figure 16:
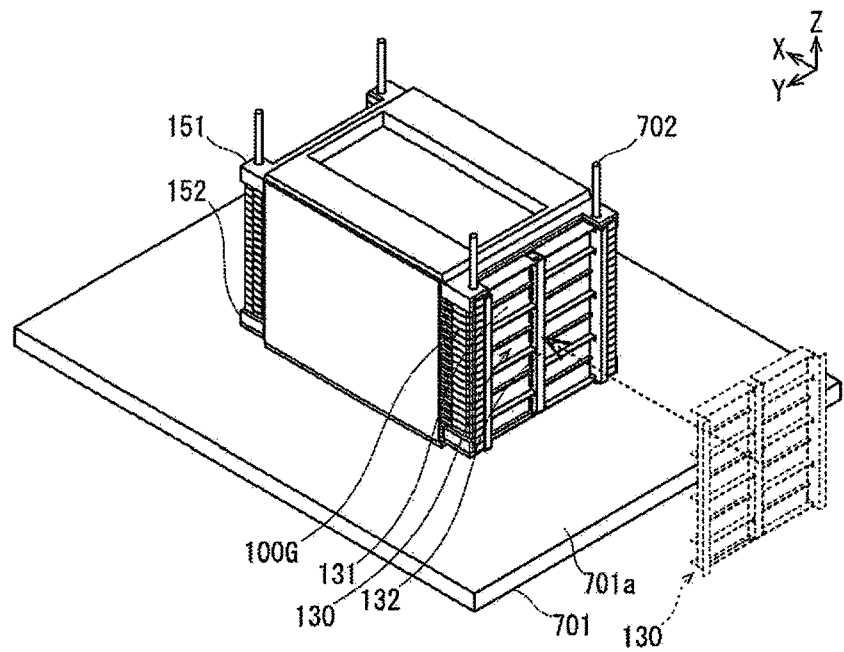
FIG. 16 is a perspective view schematically illustrating a state in which a part of the members of the bus bar unit is attached to the cell group, following FIG. 15.
Figure 17:
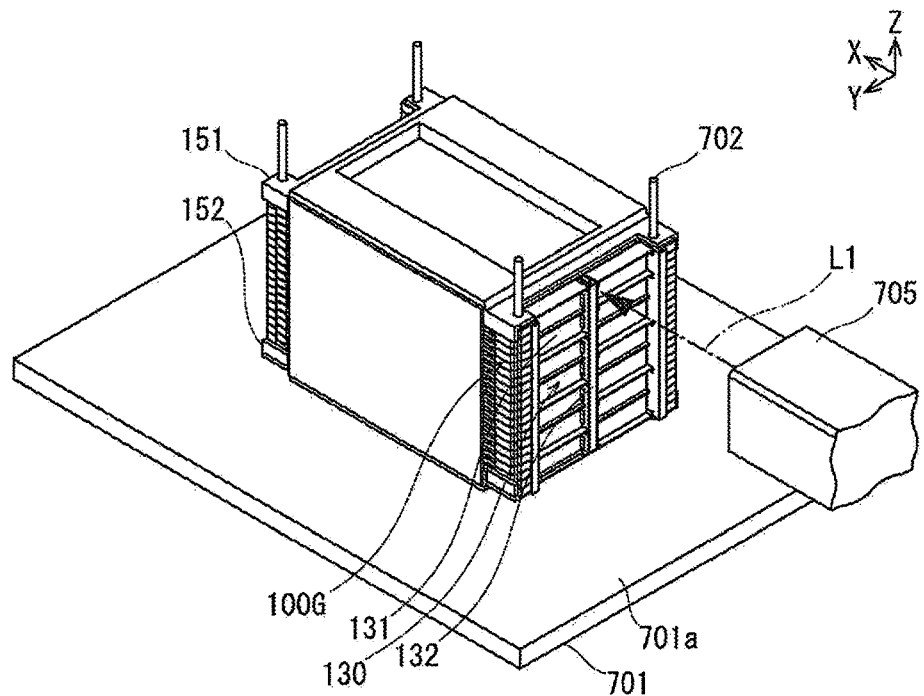
FIG. 17 is a perspective view schematically illustrating a state in which the bus bar of the bus bar unit is laser-welded to the electrode tabs of the unit cell, following FIG. 16.
Figure 18:
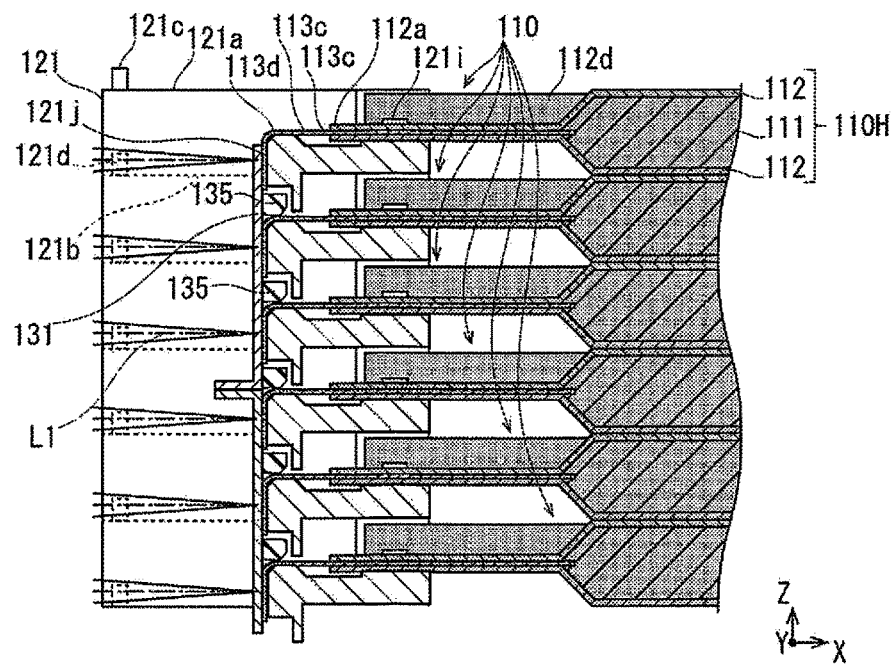
FIG. 18 is a cross-sectional view corresponding to FIG. 9B of a state in which the bus bar is laser-welded to the electrode tabs of the stacked unit cells.
Figure 19:
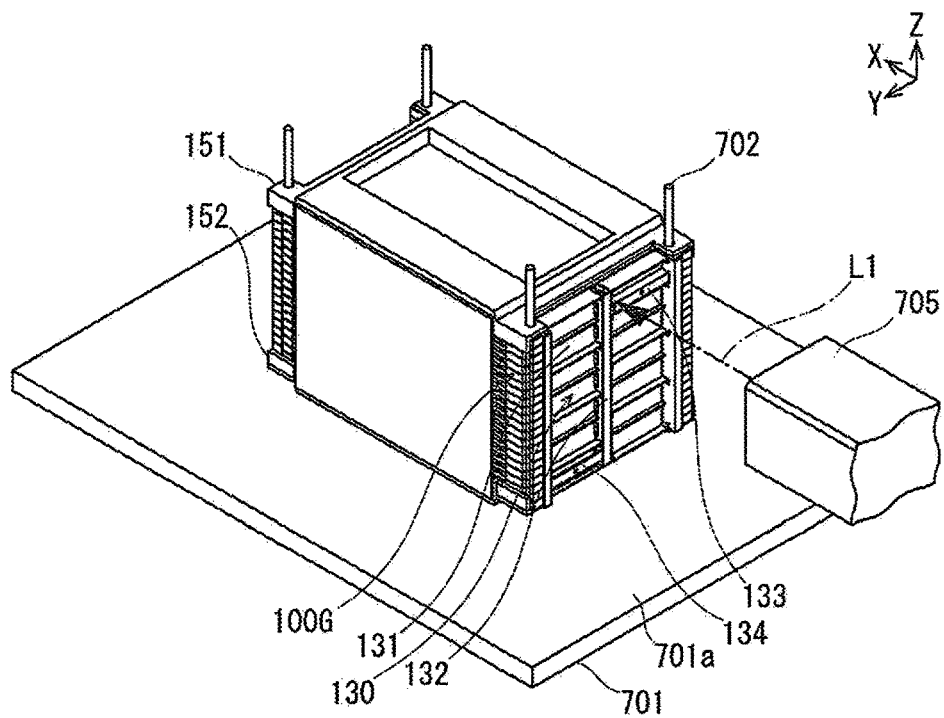
FIG. 19 is a perspective view schematically illustrating a state in which an anode side terminal and a cathode side terminal are laser-welded to an anode side bus bar and a cathode side bus bar, following FIG. 17 and FIG. 18.

FIG. 16 is a perspective view schematically illustrating a state in which a part of the members of the bus bar unit 130 is attached to the cell group 100G, following FIG. 15. FIG. 17 is a perspective view schematically illustrating a state in which the bus bar 131 of the bus bar unit 130 is laser-welded to the electrode tabs 113 of the unit cell 110, following FIG. 16. FIG. 18 is a cross-sectional view corresponding to FIG. 9B of a state in which the bus bar 131 is laser-welded to the electrode tabs 113 of the stacked unit cells 110. FIG. 19 is a perspective view schematically illustrating a state in which an anode side terminal 133 and a cathode side terminal 134 are laser-welded to an anode side bus bar 131A and a cathode side bus bar 131K, following FIG. 17 and FIG. 18.

In the second joining step, the mounting table 701 rotates 90 degrees counterclockwise as shown in the drawing to cause the electrode tabs 113 of the cell group 100G and the laser oscillator 705 to face each other, as illustrated in FIG. 15 and FIG. 16.

Next, a restricting member 135 for restricting the position of the distal end portion 113d of the electrode tab 113 is disposed between electrode tabs 113. Specifically, the restricting member 135 is disposed between the distal end portions 113d of the electrode tabs 113. Then, a flat plate shaped bus bar 131 is disposed so as to face the distal end portion 113d of the electrode tab 113. Furthermore, a bus bar holder 132, by which the bus bars 131 are integrally held, is kept pressed while being abutted on the corresponding electrode tabs 113 of the cell group 100G by using a robot arm.

In the present embodiment, a bus bar holder 132 provided with a restricting member 135 is attached to the cell group 100G. Accordingly, the arrangement of the restricting member 135 between the electrode tabs 113 is also carried out by attaching the bus bar holder 132 to the cell group 100G (refer to FIGS. 12A and B).

Next, the laser oscillator 705 irradiates the laser light L1 onto the bus bar 131 and joins the bus bar 131 to the distal end portions 113d of the electrode tabs 113 by seam welding or spot welding, as illustrated in FIG. 17 and FIG. 18.

At this time, a restricting member 135 for restricting the position of the distal end portion 113d of the electrode tab 113 is disposed between the electrode tabs 113. Accordingly, it is possible to maintain the bus bar 131 parallel to the surface of the distal end portion 113d of the electrode tab 113 along the stacking direction Z. Therefore, it is possible to carry out joining in a state in which the bus bar 131 and the surface of the distal end portion 113d of the electrode tab 113 along the stacking direction Z are sufficiently brought in contact at the joint portion with the bus bar 131. As a result, it is possible to improve the joining quality between the electrode tab 113 and the bus bar 131.

Next, the anode side terminal 133 is joined to the anode side bus bar 131A corresponding to the anode side terminal end (upper right in FIG. 4), from among the bus bars 131 arranged in a matrix, as illustrated in FIG. 16. In the same manner, the cathode side terminal 134 is joined to the cathode side bus bar 131K corresponding to the cathode side terminal end (lower left in FIG. 4), from among the bus bars 131 arranged in a matrix.

The mounting step in which a protective cover 140 is attached to the bus bar 131 will be described, with reference to FIG. 20.

Figure 20:
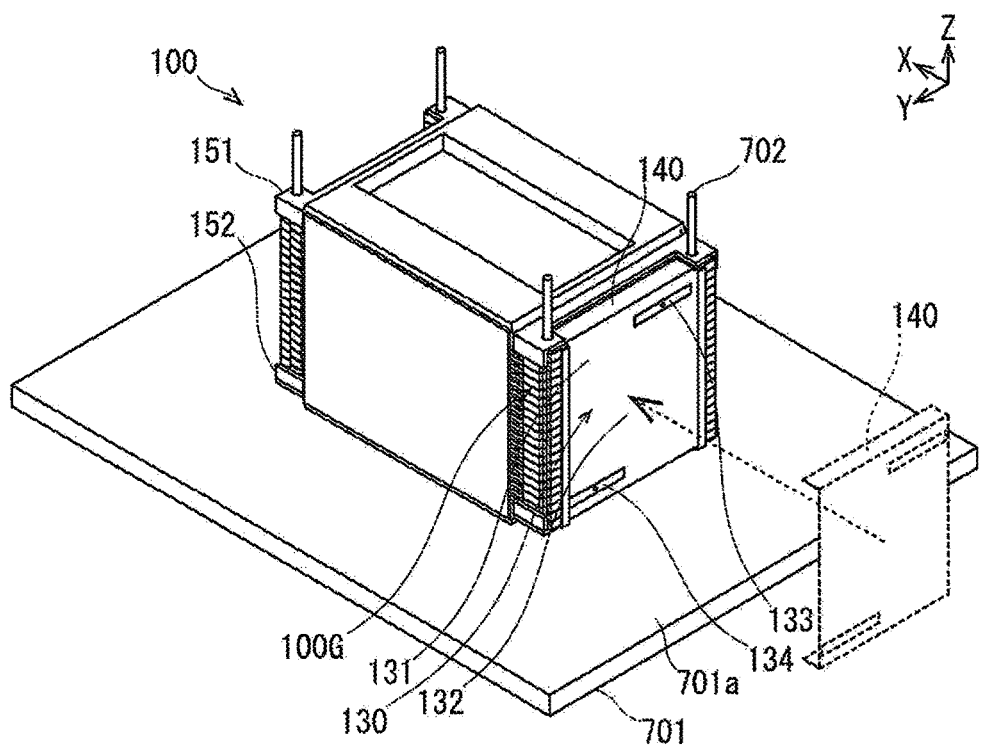
FIG. 20 is a perspective view schematically illustrating a state in which a protective cover is attached to the bus bar unit, following FIG. 19.

FIG. 20 is a perspective view schematically illustrating a state in which a protective cover 140 is attached to the bus bar unit 130, following FIG. 19.

In the mounting step, a protective cover 140 is attached to the bus bar unit 130 while fitting the upper end 140b and the lower end 140c of the protective cover 140 to the bus bar unit 130, using the robot arm. The upper end 140b and the lower end 140c of the protective cover 140 may be joined to the bus bar unit 130 by using an adhesive. The protective cover 140 exposes the anode side terminal 133 to the outside from the first opening 140d and exposes the cathode side terminal 134 from the second opening 140e to the outside. The protective cover 140 covers the bus bar unit 130 to prevent the bus bars 131 from short-circuiting with each other and from coming in contact with an external member and being short-circuited or causing electrical leakage. When manufacturing is completed, the battery pack 100 is removed from the mounting table 701 and carried out to an inspection step for inspecting the battery performance, and the like.

The manufacturing method of the battery pack 100 described with reference to FIGS. 13-20 may be embodied by an automatic machine in which all of the steps are controlled by using a controller, a semiautomatic machine in which a portion of the steps are carried out by a worker or a manual machine in which all of the steps are carried out by a worker.

According to the battery pack 100 according to the embodiment described above, the following actions and effects can be achieved.

The battery pack 100 of the present embodiment comprises the cell group 100G and the bus bars 131. The cell group 100G includes a plurality of the unit cells 110 stacked in the thickness direction, each of the unit cells 110 including a cell body 110H having a power generation element 111 with a flat shape and an electrode tab 113 protruding out from the cell body 110H. In the battery pack 100, the distal end portions 113d of the electrode tabs 113 are bent along the stacking direction Z of the unit cells 110. The bus bar 131 is flat-shaped and is joined to the distal end portions 113d of the electrode tabs 113 while facing the distal end portions 113d of the electrode tabs 113 of the unit cells 110, and electrically connects the electrode tabs 113 of at least two of the unit cells 110 to each other. The battery pack 100 according to the present embodiment further has a restricting member 135 that is disposed between electrode tabs 113 that are adjacent to each other in the stacking direction Z of the unit cells 110, and restricts the positions of the distal end portions 113d of the electrode tabs 113 in the stacking direction Z.

According to a battery pack 100 configured in this manner, the distal end portion 113d of the electrode tab 113 is bent along the stacking direction Z of the unit cells 110. Then, the bus bar 131 is formed in a flat plate shape and joined in a state of facing the distal end portion 113d of the electrode tab 113 of the unit cell 110. Accordingly, it becomes easy to bring the bus bar 131 and the distal end portion 113d of the electrode tab 113 in contact. Furthermore, in the battery pack 100 according to the present embodiment, a restricting member 135, which restricts the position of the distal end portion 113d of the electrode tab 113, is disposed between electrode tabs 113. Accordingly, even if the positions of the unit cells 110 are displaced in the stacking direction Z, it is possible to prevent the positions of the distal end portions 113d of the electrode tabs 113 from being displaced from predetermined joining positions. In addition, even if the positions of the unit cells 110 are displaced in the stacking direction Z, it is possible to maintain the surface of the distal end portion 113d of the electrode tab 113 along the stacking direction Z and the bus bar 131 in a parallel state at the joint portion. Accordingly, it is possible to bring the bus bar 131 and the surface of the distal end portion 113d of the electrode tab 113 along the stacking direction Z sufficiently in contact at the joint portion with the bus bar 131. As a result, it is possible to improve the joining quality between the electrode tab 113 and the bus bar 131. Therefore, it is possible to provide a battery pack in which sufficient conduction can be obtained between a bus bar and the electrode tab of each unit cell.

In the battery pack 100 according to the present embodiment, the restricting member 135 is disposed between the distal end portions 113d of the electrode tabs 113.

According to the battery pack 100 configured in this manner, the movement of the distal end portion 113d of the electrode tab 113 is restricted between the restricting members 135. Accordingly, it is possible to more precisely regulate the position of the distal end portion 113d of the electrode tab 113. Accordingly, it is possible to improve the joining quality between the electrode tab 113 and the bus bar 131.

The battery pack 100 of the present embodiment further comprises a bus bar holder 132 that holds the bus bar 131. The restricting member 135 is provided on the bus bar holder 132.

According to the battery pack 100 configured in this manner, it is possible to dispose the restricting member 135 between electrode tabs 113 at the same time as attaching the bus bar 131. Accordingly, it becomes easy to dispose the restricting member 135 between electrode tabs 113. In addition, since it is not necessary to separately prepare an attaching member, etc., for disposing the restricting member 135, it is possible to reduce the number of parts required for disposing the restricting member 135. Accordingly, since the volume of space necessary for attaching the restricting member 135 can be reduced, the volumetric efficiency of the battery pack 100 is improved.

In the battery pack 100 according to the present embodiment, the restricting member 135 is disposed on both end portions 113f of the electrode tabs 113 in the width direction.

According to the battery pack 100 configured in this manner, it is possible to regulate the movement of the distal end portion 113d of the electrode tab 113 with the minimum required restricting member 135. Accordingly, it is possible to restrict the position of the distal end portion 113d of the electrode tab 113 at a low cost.

In the battery pack 100 according to the present embodiment, a guide portion 135b, which has a slope in which the distance from the electrode tab 113 becomes greater toward the proximal end portion 113c side, is provided from a portion 135a of the restricting member 135 opposing the electrode tab 113 to a portion on the proximal end portion 113c side of the electrode tab 113 (corresponding to the proximal end side).

According to the battery pack 100 configured in this manner, it is possible to prevent the restricting member 135 from being caught by the electrode tab 113, when disposing the restricting member 135 between the electrode tabs 113. Accordingly, it becomes easier to dispose the restricting member 135 between electrode tabs 113.

The battery pack 100 according to the present embodiment further comprises a first spacer 121 that is configured as a body separate from the restricting member 135 and that is disposed in a state of sandwiching an electrode tab 113 with the restricting member 135, and maintains the interval between adjacent electrode tabs 113 by restricting the movement of the electrode tab 113 in a direction different from that of the restricting member 135.

According to the battery pack 100 configured in this manner, since the movement of the distal end portion 113d of the electrode tab 113 can be limited between the restriction member 135 and the first spacer 121, it is possible to more precisely regulate the position of the distal end portion 113d of the electrode tab 113.

In the battery pack 100 according to the present embodiment, the first spacer 121 comprises a restricting portion 121p disposed facing an electrode tab 113, whose movement is restricted between the restricting member 135 and the first spacer, to restrict the movement of said electrode tab 113, and a leg portion 121q extended from the restricting portion 121p toward a different electrode tab 113 adjacent to said electrode tab 113, to restrict the movement of said different electrode tab 113.

According to the battery pack 100 configured in this manner, it is possible to prevent a different electrode tab 113 that is adjacent to an electrode tab 113, whose movement is restricted between a restricting member 135 and a first spacer 121, from being lifted up to the side of the electrode tab 113 whose movement is restricted between a restricting member 135 and a first spacer 121. Accordingly, it is possible to reliably maintain the interval between the electrode tabs 113 by using the first spacer 121. Accordingly, it becomes easier to dispose the restricting member 135 between electrode tabs 113.

In the battery pack 100 according to the present embodiment, a gap is formed between the leg portion 121q of the first spacer 121 and the electrode tab 113 whose movement is restricted by using said leg portion 121q.

According to the battery pack 100 configured in this manner, even if the positions of the unit cells 110 are displaced in the stacking direction Z, it is possible to prevent the generation of locally concentrated stress in the electrode tab 113 by using the leg portion 121q of the first spacer 121.

In the battery pack 100 according to the present embodiment, the distance H1 from the surface of the restricting portion 121p of the first spacer 121 opposing the electrode tab 113 to the distal end portion 121r of the leg portion 121q is greater than the sum of the length H2 of the portion of the distal end portion 113d of the electrode tab 113 along the stacking direction Z opposing the restricting portion 121p and the length H3 in the stacking direction Z of the restricting member 135 disposed between said electrode tab 113 and an electrode tab 113 adjacent to said electrode tab 113.

According to the battery pack 100 configured in this manner, it is possible to maintain the interval 114 between the distal end portions 113d of the electrode tabs 113 to equal to or greater than the length H3 of the restricting member 135 in the stacking direction Z. Accordingly, it becomes easier to dispose the restricting member 135 between electrode tabs 113.

In the battery pack 100 according to the present embodiment, the portion 135c of the guide portion 135b most separated from the electrode tab 113 is in a position farther away from the electrode tab 113 than the distal end portion 121r of the leg portion 121q of the first spacer 121 in the stacking direction Z of the unit cell 110.

According to the battery pack 100 configured in this manner, when inserting the restricting member 135 between electrode tabs 113, it is possible to reliably guide the electrode tab 113 by using the guide portion 135b formed in the restricting member 135, even if the electrode tab 113 has moved to a position abutting the leg portion 121q of the first spacer 121. Accordingly, it becomes easier to dispose the restricting member 135 between electrode tabs 113.

Modified Example

In the embodiment described above, the restricting member 135 is disposed between the distal end portions 113d of electrode tabs 113 that are adjacent in the stacking direction Z of the unit cells 110. However, the mode of the restricting member is not limited as long as the restricting member is disposed between electrode tabs that are adjacent to each other in the stacking direction of the unit cells and regulates the positions of the distal end portions of the electrode tabs in the stacking direction. For example, the leg portion 121q provided on the spacer 121 may be configured as the restricting member, instead of the restricting member 135 in the present embodiment described above.

Specifically, instead of using a restricting member 135, the position of the leg portion 121q provided on the spacer 121 is moved from the proximal end side to the distal end side of the electrode tab 113. More specifically, the leg portion 121*q* is moved to a position facing, from among the portions of the electrode tab 113 that intersect with the stacking direction Z, the portion on the side of the location of the electrode tab 113 that is bent at the distal end portion 113*d*. Then, the position of the distal end portion 113*d* of the electrode tab 113 may be restricted in the stacking direction Z, by restricting the position of, from among the portions of the electrode tab 113 that intersect with the stacking direction Z, the portion on the side of the location of the electrode tab 113 that is bent at the distal end portion 113*d* with the leg portion 121*q*.

The battery pack 100 was described through the embodiment above, but the present invention is not limited to the configuration described in the embodiment and may be appropriately modified based on the descriptions of the Claims.

For example, in the above-described embodiment and Modified Example, the anode side electrode tab and the cathode side electrode tab protrude out from one side of the cell body. However, the anode side electrode tab and the cathode side electrode tab may be respectively protruding out from different opposing sides of the cell body.

In addition, in the embodiment described above, the restricting member 135 is disposed on both end portions 113*f* of the electrode tabs 113 in the width direction. However, the restricting member 135 may be provided across the entire width direction of the electrode tab 113.

The invention claimed is:

1. A battery pack comprising:
    a cell group including a plurality of unit cells stacked in a stacking direction, each of the plurality of unit cells including: a cell body having a power generation element and a flat shape, and an electrode tab protruding out from the cell body, and each of the electrode tabs having distal end portions bent along the stacking direction of the plurality of unit cells;
    a spacer disposed between adjacent electrode tabs of the plurality of electrode tabs, the adjacent electrode tabs being adjacent to each other in the stacking direction, to maintain an interval between the adjacent electrode tabs in the stacking direction;
    a plurality of flat plate shaped bus bars electrically connecting electrode tabs of at least two of the unit cells to each other; and
    a bus bar holder that holds the plurality of flat plate shaped bus bars,
    the bus bar holder comprising a restricting member disposed between distal end portions of the adjacent electrode tabs, the distal end portions extending along the stacking direction,
    the restricting member extending along the stacking direction and restricting a stacking direction position of each of the distal end portions of the adjacent electrode tabs by sandwiching the adjacent electrode tabs with the spacer,
    the distal end portions of the adjacent electrode tabs being welded to a surface of the plurality of flat plate shaped bus bars, the surface facing the unit cells in a state in which the stacking direction position of each of the distal end portions of the adjacent electrode tabs is restricted by the restricting member and the spacer, and each of the distal end portions of the electrode tabs being bent in a same direction.

2. The battery pack according to claim 1, wherein each of the distal end portions of the adjacent electrode tabs and the surface of the plurality of flat plate shaped bus bars that faces the unit cells are brought into contact and welded to each other.

3. The battery pack according to claim 1, wherein the bus bar holder holds the plurality of flat plate shaped bus bars in a state before being attached to the cell group.

4. The battery pack according to claim 1, wherein the restricting member is disposed on both end portions of the adjacent electrode tabs in a widthwise direction.

5. The battery pack according to claim 1, wherein the restricting member includes a guide portion that extends from a portion of the restricting member that opposes the adjacent electrode tabs to a proximal end portion of the adjacent electrode tabs and slopes such that a distance from the portion of the restricting portion opposing the adjacent electrode tabs becomes greater toward the proximal end portion.

6. The battery pack according to claim 1, wherein the spacer comprises a restricting portion disposed between the adjacent electrode tabs to restrict movement of the adjacent electrode tabs between the restricting member and the spacer, and the spacer further comprises a leg portion extending from the restricting portion toward a different electrode tab of the plurality of electrode tabs that is adjacent to the adjacent electrode tabs in the stacking direction to restrict movement of the different electrode tab.

7. The battery pack according to claim 6, wherein a gap is formed between the leg portion of the spacer and the different electrode tab that is restricted by the leg portion.

8. The battery pack according to claim 6, wherein the restricting portion includes a surface opposing the adjacent electrode tabs, the surface is spaced by a distance from a distal end portion of the leg portion that is greater than a sum of a stacking direction length of the distal end portions of the adjacent electrode tabs and a stacking direction length of the restricting member disposed between the adjacent electrode tabs and the different electrode tab.

9. The battery pack according to claim 5, wherein the spacer comprises a restricting portion disposed between the adjacent electrode tabs to restrict movement of the adjacent electrode tabs between the restricting member and the spacer, and the spacer further comprises a leg portion extending from the restricting portion toward a different electrode tab of the plurality of electrode tabs that is adjacent to the adjacent electrode tabs to restrict the movement of the different electrode tab, and
a part of the guide portion most separated from the adjacent electrode tabs is farther away from the adjacent electrode tabs in the stacking direction than a distal end portion of the leg portion of the spacer.

* * * * *